United States Patent
Allam et al.

(10) Patent No.: US 12,419,317 B1
(45) Date of Patent: Sep. 23, 2025

(54) PLANT DERIVED FOOD PRESERVATIVE

(71) Applicant: IMAM MOHAMMAD IBN SAUD ISLAMIC UNIVERSITY, Riyadh (SA)

(72) Inventors: Ahmed Aly Ahmed Allam, Riyadh (SA); Hassan Ahmed Rudayni, Riyadh (SA); Rehab Khaled Mahmoud, Beni-Suef (EG); Nabil Sayed Hafez, Faiyum (EG); Saleh Ahmed Nomain Maodaa, Riyadh (SA); Khalil Ibrahim Khalil, Faiyum (EG); Samah Ahmed Abd-El Twab Awad, Faiyum (EG); Amany Ahmed Abd-El Halim Mohamed, Faiyum (EG)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 18/967,337

(22) Filed: Dec. 3, 2024

(51) Int. Cl.
```
A23B 2/788      (2025.01)
A01N 59/16      (2006.01)
A01P 1/00       (2006.01)
A23B 2/733      (2025.01)
```

(52) U.S. Cl.
CPC ............. *A23B 2/788* (2025.01); *A01N 59/16* (2013.01); *A01P 1/00* (2021.08); *A23B 2/733* (2025.01)

(58) Field of Classification Search
CPC ........ A23B 2/788; A23B 2/733; A01N 59/16; A01N 65/08; A01N 2300/00; A01P 1/00; A61K 33/30; A61K 36/21; A61K 36/31
See application file for complete search history.

(56) References Cited

U.S. PATENT DOCUMENTS

2012/0282351 A1* 11/2012 Najafi ................... A61K 9/0024
424/661
2022/0400683 A1 12/2022 Blanco Tirado

FOREIGN PATENT DOCUMENTS

| CN | 107455456 A | 12/2017 |
| CN | 112280067 A | 1/2021 |
| IN | 202441006659 A | 3/2024 |
| KR | 2582150 B1 | 9/2023 |

OTHER PUBLICATIONS

B. Vijaya Kumar, Bellemkonda Ramesh, Srinivasan Kameswaran, N. Supraja, and Gopi Krishna Pitchika, "Zinc Oxide Nanoparticles Synthesis Using Herbal Plant Extracts and Its Applications", Agricultural and Environmental Nanotechnology, 2023, 221-249 (Year: 2023).*
Muthu Thiruvengadam et al., "A comprehensive review of beetroot (*Beta vulgaris* L.) bioactive components in the food and pharmaceutical in the food and pharmaceutical industries", Critical Reviews in Food Science and Nutrition, 2024, 64:3, 708-739 (Year: 2024).*
Parveen Zia, Mishra Sunita and Singh Sneha, "Extraction of Natural Colour from Beet Root (*Beta vulgaris*) its Phytochemical Analysis and Antibacterial Activity", EAS Journal of Nutrition and Food Science, 2021, 3(4), 80-85 (Year: 2021).*
Vijaylaxmee Mishra and Richa Sharma, "Green Synthesis of Zinc Oxide Nanoparticles Using Fresh Peels Extract of Punica granatum and its Antimicrobial Activities", International Journal of Pharma Research and Health Sciences, 2015, 3(3), 694-699 (Year: 2015).*
Zaineb L. Abdullah and Rasha K. Mohammed, "The Study of the Antibacterial Effect of Anthocyanin Pigment Extracted From Red Cabbage (*Brassica oleracea*var. *capitata* f. rubra) and Red Radish Peels (*Raphanus sativus* .var. *sativus*)", 2024 IOP Conf. Series: Earth and Environmental Science 1371, 052089 (Year: 2024).*
Wassan Mhammed Husain, Jawad K. Araak and Orooba MS Ibrahim, "Green synthesis of zinc oxide nanoparticles from (*Punica granatum* L) pomegranate aqueous peel extract", The Iraqi Journal of Veterinary Medicine, 2019, 43(2): 6-14 (Year: 2019).*
Amany Abd El-Halim, N. Hafez, K. Khalil, Rehab Mahmoud and Samah Abd El-Tawab, "Effectiveness of Zinc Oxide Nanoparticles, Red Cabbage and Beet Root in Reducing Bacterial and Fungal Growth in Refrigerated Beef Kofta", J. of Food and Dairy Sci., Mansoura Univ., 2024, 15(11): 177-185 (Year: 2024).*
Ugochi Lydia Ifeanyichukwu, Omolola Esther Fayemi and Collins Njie Ateba, "Green Synthesis of Zinc Oxide Nanoparticles from Pomegranate (*Punica granatum*) Extracts and Characterization of Their Antibacterial Activity", Molecules, 2020, 25, 4521, 1-22 (Year: 2020).*
Maryam Kokabi and Samad Nejad Ebrahimi, "Polyphenol Enriched Extract of Pomegranate Peel; A Novel Precursor for the Biosynthesis of Zinc Oxide Nanoparticles and Application in Sunscreens", Pharmaceutical Sciences, 2021, 27(1), 102-110 (Year: 2021).*
Rishana Saffar, Athira PV, Kangkana Kalita, Suba G A Manuel and Pradeep N, "Nanoparticle Synthesis from Biowaste and Its Potential as an Antimicrobial Agent", Research Square, Jan. 16, 2021, (Year: 2021).*
Wali S, et al., "*Brassica oleracea* L. (Acephala Group) based zinc oxide nanoparticles and their efficacy as antibacterial agent", Brazilian Journal of Biology, vol. 84, 2024, 9 Pages.
Sukri SN, et al., "Cytotoxicity and antibacterial activities of plant-mediated synthesized zinc oxide (ZnO) nanoparticles using *Punica granatum* (pomegranate) fruit peels extract", Journal of Molecular Structure, vol. 1189, Aug. 5, 2019, pp. 57-65.

* cited by examiner

*Primary Examiner* — Mina Haghighatian
*Assistant Examiner* — Nathan W Schlientz
(74) *Attorney, Agent, or Firm* — Oblon, McClelland, Maier &Neustadt, L.L.P.

(57) ABSTRACT

A food preservative including zinc oxide nanoparticles derived from a pomegranate peel extract and a nanocomposite obtained from at least one of a beetroot extract and a red cabbage extract. The food preservative is characterized by a Fourier-transform infrared spectroscopy (FTIR) pattern including a broad peak at 3500 cm$^{-1}$ to 3000 cm$^{-1}$ and a series of three peaks at 900 cm$^{-1}$ to 1200 cm$^{-1}$.

19 Claims, 13 Drawing Sheets

PLANT DERIVED FOOD PRESERVATIVE

STATEMENT REGARDING PRIOR DISCLOSURES BY JOINT INVENTOR

Aspects of the present application were disclosed by joint inventors of the present application in the publication entitled "Effectiveness of Zinc Oxide Nanoparticles, Red Cabbage and Beet Root in Reducing Bacterial and Fungal Growth in Refrigerated Beef Kofta," in *J. Food Dairy Sci. Mansoura Univ.* 2024, 15(11), 177-185.

BACKGROUND

Technical Field

The present disclosure is directed towards a food preservative, and more particularly, to a food preservative including zinc oxide nanoparticles and a nanocomposite derived from plant-based sources.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

With the growing diversity of food products and the extension of distribution periods, including low-temperature distribution, there is an increased risk of microbial contamination and spoilage by bacteria, yeast, and fungi. Microbial contamination is a major cause of food spoilage, resulting in economic losses to food producers and health hazards for consumers. Traditional food preservation methods, such as high-temperature, high-pressure treatments, and irradiation, are commonly used to eliminate risk of contamination due to the presence of microorganisms. Recently, the incorporation of synthetic preservatives with antimicrobial properties into food products has emerged as a strategy. Synthetic preservatives may be used in the food industry; however, these preservatives may have an adverse impact on the health of the consumer, requiring a need for safe, natural sources as alternatives to synthetic additives.

Accordingly, it is one object of the present disclosure to provide a food preservative having antimicrobial and antioxidant activity that may circumvent the the drawbacks and limitations such as, high toxicity, high concentration need, and low antimicrobial activity, of current materials known in the art.

SUMMARY

In an exemplary embodiment, a food preservative having antimicrobial and antioxidant activity is described. The food preservative comprises zinc oxide nanoparticles derived from a pomegranate peel extract and a nanocomposite obtained from at least one of a beetroot extract and a red cabbage extract. The food preservative is characterized by a Fourier-transform infrared spectroscopy (FTIR) pattern including a broad peak at 3500 $cm^{-1}$ to 3000 $cm^{-1}$ and a series of three peaks at 900 $cm^{-1}$ to 1200 $cm^{-1}$. The obtained food preservative is a crystalline solid having a crystallite size of 0.15 to 0.26 nanometers (nm).

In some embodiments, the nanocomposite is obtained from the beetroot extract and the food preservative has an inhibition zone diameter of at least 6 millimeters (mm) against *Staphylococcus aureus* gram-positive bacteria.

In some embodiments, the nanocomposite is obtained from the red cabbage extract and the food preservative has an inhibition zone diameter of at least 13 mm against *Staphylococcus aureus* gram-positive bacteria.

In some embodiments, the nanocomposite is obtained from the beetroot extract and the food preservative has an inhibition zone diameter of at least 8 mm against *Bacillus cereus* gram-positive bacteria.

In some embodiments, the nanocomposite is obtained from the red cabbage extract and the food preservative has an inhibition zone diameter of at least 16 mm against *Bacillus cereus* gram-positive bacteria.

In some embodiments, the nanocomposite is obtained from the red cabbage extract, and the food preservative has an inhibition zone diameter of at least 10 mm against *Escherichia coli* gram-negative bacteria.

In some embodiments, the food preservative has a half-maximal inhibitory concentration of 1,1-diphenyl-2-picryl-hydrazyl (DPPH) radicals ($IC_{50}$) of 4 milligrams/milliliters (mg/mL) or less.

In some embodiments, the nanocomposite is obtained from the beetroot extract and the food preservative has an inhibition zone diameter of at least 6 mm against *Apergillus niger* fungus.

In some embodiments, the nanocomposite is obtained from the red cabbage extract, and the food preservative has an inhibition zone diameter of at least 12 mm against *Aspergillus niger* fungus.

In another embodiment, a method of fabricating the food preservative is described. The method comprises preparing the pomegranate peel extract, mixing the pomegranate peel extract with a hydrated zinc salt to obtain zinc oxide nanoparticles. The method further comprises grinding at least one of the beetroot and the red cabbage to obtain a powder, calcining the powder to obtain the nanocomposite and combining the nanocomposite with the zinc oxide nanoparticles to obtain the food preservative.

In some embodiments, the hydrated zinc salt is at least one selected from the group consisting of zinc sulfate heptahydrate ($ZnSO_4 \cdot 7H_2O$), zinc sulfate hexahydrate ($ZnSO_4 \cdot 6H_2O$), zinc acetate dihydrate ($Zn(CH_3CO_2)_2 \cdot 2H_2O$), zinc nitrate hexahydrate ($Zn(NO_3)_2 \cdot 6H_2O$), and zinc chloride dihydrate ($ZnCl_2 \cdot nH_2O$).

In some embodiments, the hydrated zinc salt is zinc acetate dihydrate ($Zn(CH_3CO_2)_2$).

In some embodiments, the nanocomposite is a powder having an average particle size of less than 100 nm.

In some embodiments, the method further comprises washing a pomegranate peel and drying at a temperature of 30° C. to 50° C. for 24 to 36 hours to obtain a dried peel and grinding the dried peel to obtain a powder, then mixing the powder with a protic solvent to obtain the pomegranate peel extract.

In some embodiments, the nanocomposite is a powder having an average particle size of less than 80 nm.

In some embodiments, the protic solvent is at least one selected from the group consisting of water, ethanol, methanol, acetic acid, ammonia, and formic acid.

In yet another exemplary embodiment, a method of inhibiting a growth of at least one bacterium and/or at least one fungus is described. The method comprises contacting the obtained food preservative to a food product. The bacterium is selected from the group consisting of a gram-positive bacterium and a gram-negative bacterium and the fungus is selected from the group consisting of a yeast, a mold, and a saprotroph.

In some embodiments, the bacterium is selected from the group consisting of Staphylococcus aureus, Staphylococcus pneumoniae, Listeria monocytogenes, Haemophilus influenza, Bacillus subtilis, and Escherichia coli.

In some embodiments, the fungus is selected from Candida albicans, Aspergillus flavus, Mucor circinelloides, Aspergillus fumigatus, Penicillium notatum, and Aspergillus niger.

In yet another exemplary embodiment, a method of reducing a biofilm formation is described. The method comprises inhibiting the initial adhesion phase of the biofilm by contacting the food preservative of to a surface. The surface is selected from a group consisting of a living tissue surface, an indwelling medical device surface, a liquid surface, an industrial or potable water system pipe surface, and a natural aquatic system surface. The biofilm formation includes a microorganism selected from the group consisting of a gram-positive bacterium, a gram-negative bacterium, and a fungus.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
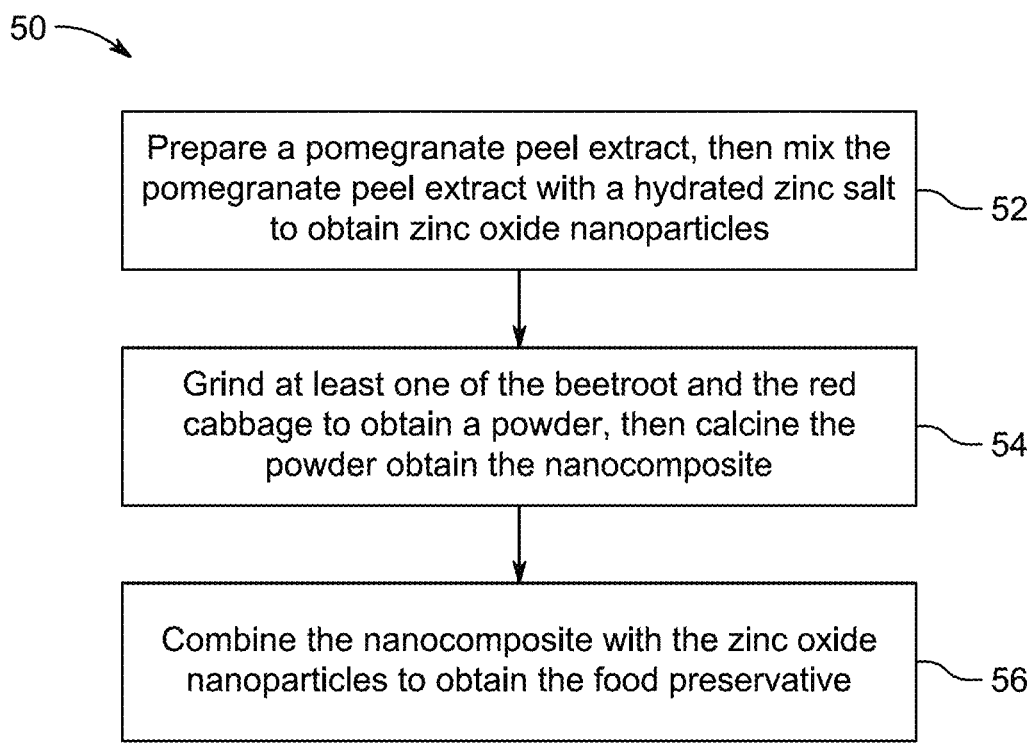
FIG. 1A is a flowchart depicting a method of fabricating a food preservative, according to certain embodiments.

In the drawings, reference numerals designate identical or corresponding parts throughout the several views. Further, as used herein, the words "a," "an" and the like generally carry a meaning of "one or more," unless stated otherwise.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, the term "preservative" refers to a natural or artificial chemical that is added to a varied range of products, such as food products, beverages, pharmaceutical drugs, paints, cosmetics, wood, etc., to prevent putrefaction by microbial growth or by various undesirable chemical changes.

As used herein, "crystallite" refers to a domain of solid-state matter that has the same structure with the same crystallographic orientation. A crystallite is generally of small dimensions, e.g., from a few nanometers to several millimeters in the longest dimension. Crystallites may be bonded together by substantially irregular boundaries and include materials such as polycrystalline solids.

As used herein, the term "biofilm" refers to a population of microorganisms concentrated at an interface (usually solid/liquid) and typically surrounded by an extracellular polymeric slime matrix. Biofilms may form on living or non-living surfaces in natural, industrial, and hospital settings. Biofilms can contain many different microorganisms, e.g., bacteria, archaea, protozoa, fungi, and algae.

As used herein, the term, "antioxidant" refers to compounds in food products that scavenge and neutralize free radicals.

The present disclosure describes a food preservative comprising zinc oxide nanoparticles derived from pomegranate peel extract and a nanocomposite obtained from a beetroot extract or a red cabbage extract, resulting in a preservative that possess increased antioxidant and antimicrobial characteristics due to the synergy between the zinc oxide nanoparticles and the nanocomposite obtained from a beetroot extract or a red cabbage extract.

Pomegranate peels may be a rich source of essential nutrients such as proteins and carbohydrates. In one embodiment, the pomegranate peel has a moisture content of about 5 to 20 wt. % based on the total weight of the pomegranate peels, a protein content of about 1 to 8 wt. % based on the total weight of the pomegranate peels, a fat content of about 1 to 10 wt. % based on the total weight of the pomegranate peels, an ash content of about 1 to 8 wt. % based on the total weight of the pomegranate peels, and a carbohydrate content of about 60 to 75 wt. % based on the total weight of the pomegranate peels. In another embodiment, the pomegranate peel has a moisture content of about 12.23±0.01 wt. % based on the total weight of the pomegranate peels, a protein content of about 2.33±0.01 wt. % based on the total weight of the pomegranate peels, a fat content of about 2.60±0.01 wt. % based on the total weight of the pomegranate peels, an ash content of about 3.56±0.01 wt. % based on the total weight of the pomegranate peels, fiber content of about 12.10±0.01 wt. % based on the total weight of the pomegranate peels, and carbohydrate content of about 67.09±0.01 wt. % based on the total weight of the pomegranate peels.

Pomegranate peels are also rich in bioactive compounds such as phenols and flavonoids. In one embodiment, the extract of the pomegranate peel comprises at least one selected from the group consisting of a phenol and a flavonoid. In one embodiment, the extract of the pomegranate peel comprises a phenol. Pomegranate peels comprise phenols including, but not limited to, chlorogenic acid, caffeic acid, syringic acid, synaptic acid, p-coumaric acid, ferulic acid, ellagic acid, gallic acid, and cinnamic acid. In another embodiment, the extract of the pomegranate peel comprises a flavonoid. Pomegranate peels comprise flavonoids including, but not limited to, pelargonidin, delphinidin, cyanidin, catechin, epicatechin, and quercetin. In yet another embodiment, the extract of the pomegranate peel comprises a phenol and a flavonoid. In an embodiment, the extract of the pomegranate peel has a phenol content of about 100 to 400 mg gallic acid equivalents per gram of dry weight (GAE/g DW), preferably 110 to 390 mg GAE/g DW, preferably 120 to 380 mg GAE/g DW, preferably 130 to 370 mg GAE/g DW, preferably 140 to 360 mg GAE/g DW, preferably 150 to 350 mg GAE/g DW, preferably 160 to 340 mg GAE/g DW, preferably 170 to 330 mg GAE/g DW, preferably 180 to 320 mg GAE/g DW, preferably 190 to 310 mg GAE/g DW, preferably 200 to 300 mg GAE/g DW, preferably 210 to 290 mg GAE/g DW, preferably 220 to 280 mg GAE/g DW, preferably 230 to 270 mg GAE/g DW, preferably 240 to 260 mg GAE/g DW, preferably 250 to 260 mg GAE/g DW, most preferably about 257.81 mg GAE/g DW. In one embodiment, the extract of the pomegranate peel comprises one or more of a phenol and a flavonoid selected from the group consisting of a gallic acid, a chlorogenic acid, a catechin, a methyl gallate, a rutin, an ellagic acid, a coumaric acid, a vanillin, a ferulic acid, a naringenin, a daidzein, a syringic acid, a quercetin, a cinnamic acid, an apigenin, and a kaempferol. In one embodiment, the one or more of a phenol and a flavonoid is selected from the group consisting of a chlorogenic acid, a catechin, a methyl gallate, a caffeic acid, a syringic acid, an ellagic acid, a vanillin, a ferulic acid, a naringenin, a daidzein, and quercetin. In one embodiment, the extract of the pomegranate peel comprises a caffeic acid. Caffeic acids include, but are not limited to, caffeic acid phenethyl ester (CAPE), ferulic acid, chlorogenic acid, caffeoylquinic acid (CGA), and caffeoyl danshensu. In some embodiments, the extract of the pomegranate peel comprises caffeic acid in an amount of 10 to 70 μg/g, preferably 20 to 60 μg/g, preferably 30 to 60 μg/g, preferably 40 to 60 μg/g, preferably 50 to 60 μg/g, most preferably 54.91 μg/g. In one embodiment, the extract of the pomegranate peel comprises vanillin in an amount of 5 to 70 μg/g, preferably 10 to 65 μg/g, preferably 15 to 60 μg/g, preferably 20 to 55 μg/g, preferably 25 to 50 μg/g, preferably 30 to 45 μg/g, preferably 35 to 40 μg/g, most preferably 37.58 μg/g. In yet another embodiment, the pomegranate peel has a flavonoid content in the range of 85 to 140 mg QE/g DW, preferably 90 to 135 mg QE/g DW, preferably 95 to 130 mg QE/g DW, preferably 100 to 125 mg QE/g DW, preferably 105 to 120 mg QE/g DW, preferably 110 to 115 mg QE/g DW, most preferably 112.32 mg QE/g DW.

Prior to extraction, the pomegranate peels may be dried and ground to obtain a dry powder. The peel may be the outer peel, the inner peel, or a combination thereof. Although the description herein provided refers to the use of peels of pomegranates, it may be understood by a person skilled in the art that the extract may also include any other constituents of pomegranates—for example, the seed, juice, or any other plant parts such as leaves, stems or bark. In one embodiment, the pomegranate peels are dried in an oven for 12 to 36 hours, preferably 14 to 36 h, preferably 16 to 36 h, preferably 18 to 36 h, preferably 20 to 36 h, preferably 22 to 36 h, most preferably 24 to 36 h. In one embodiment, the pomegranate peels are dried in an oven at a temperature of preferably 10 to 70° C., preferably 15 to 65° C., preferably 20 to 60° C., preferably 25 to 55° C., most preferably 30 to 50° C. Other methods of drying known in the art may also be utilized, with the method of drying affecting the drying time. In another embodiment, the dried pomegranate peels are ground to obtain a powder having an average particle size of 1000 nm or less, preferably 900 nm or less, preferably 800 nm or less, preferably 700 nm or less, preferably 600 nm or less, preferably 500 μm or less.

Any suitable extraction method and extraction solvent may be used. In one embodiment, after peeling the pomegranate, the peels are subjected to an extraction method to obtain the pomegranate peel extract. Suitable extraction solvents may be water, ethanol, acetone, methanol, acetonitrile, dimethyl sulfoxide (DMSO), chloroform, n-hexane, ethyl acetate, toluene, dichloromethane (DCM), isopropanol, or any other suitable extraction solvent. In one embodiment, the extraction solvent is ethanol, preferably 50% ethanol, preferably 55% ethanol, preferably 60% ethanol, preferably 65% ethanol, most preferably 70% ethanol. The pomegranate peel extract obtained is further used to prepare zinc oxide nanoparticles by method as described in FIG. 1A.

The food preservative further comprises a nanocomposite obtained from at least one of a beetroot extract and a red cabbage extract. In a specific embodiment, the nanocomposite is obtained from a beetroot extract. The term "beetroot" may include any one or more of a sugar beet, red beet, table beet, beets, *Beta vulgaris*, garden beet, and/or combination thereof. In one embodiment, the beetroot has a moisture content of 80 to 95 wt. % based on the total weight of the beetroot, preferably 81 to 94 wt. %, preferably 82 to 93 wt. %, preferably 83 to 92 wt. %, preferably 84 to 91 wt. %, preferably 85 to 90 wt. %, preferably 86 to 90 wt. %, preferably 87 to 90 wt. %, preferably 88 to 90 wt. %, preferably 89 to 90 wt. %, most preferably 89 wt. %. In one embodiment, the beetroot has a crude protein of 1 to 1.5 wt. % based on the total weight of the beetroot, preferably 1.1 to 1.4 wt. %, preferably 1.2 to 1.4 wt. %, preferably 1.3 to 1.4 wt. %, most preferably about 1.34 wt. %. In one embodiment, the beetroot has a crude fat of about 0.1 to 1 wt. % based on the total weight of the beetroot, preferably 0.2 to 0.9 wt. %, preferably 0.3 to 0.8 wt. %, preferably 0.3 to 0.7 wt. %, preferably 0.3 to 0.6 wt. %, preferably 0.3 to 0.5 wt. %, preferably 0.3 to 0.4 wt. %, most preferably 0.37 wt. %. In one embodiment, the beetroot has an ash content of about 1 to 5 wt. % based on the total weight of the beetroot, preferably 1.5 to 4.5 wt. %, preferably 1.5 to 4 wt. %, preferably 1.5 to 3.5 wt. %, preferably 1.5 to 3 wt. %, preferably 1.5 to 2.5 wt. %, preferably 1.5 to 2 wt. %, most preferably 1.51 wt. %. In one embodiment, the beetroot has a carbohydrate content of about 1 to 15 wt. % based on the total weight of the beetroot, preferably 2 to 14 wt. %, preferably 3 to 13 wt. %, preferably 4 to 12 wt. %, preferably 5 to 11 wt. %, preferably 6 to 10 wt. %, preferably 7 to 9 wt. %, preferably 7 to 8 wt. %, most preferably 7.7 wt. %.

Prior to extraction, the beetroot may be dried and ground to obtain a dry powder. The beetroot may include the taproot as well as the bulb, or a combination thereof. Although the description herein provided refers to the use of beetroot, it may be understood by a person skilled in the art that the extract may also include any other constituents of beets—for example, the bulb, stem, or any other plant parts. In one embodiment, the beetroot is dried in an oven for 12 to 36 hours, preferably 14 to 36 h, preferably 16 to 36 h, preferably 18 to 36 h, preferably 20 to 36 h, preferably 22 to 36 h, most preferably 24 to 36 h. In one embodiment, the beetroot is dried in an oven at a temperature of preferably 10 to 70° C., preferably 15 to 65° C., preferably 20 to 60° C., preferably 25 to 55° C., most preferably 30 to 50° C. Other methods of drying known in the art may also be utilized, with the method of drying affecting the drying time. In another embodiment, the dried beetroot is ground to obtain a powder having an average particle size of 1000 nm or less, preferably 900 nm or less, preferably 800 nm or less, preferably 700 nm or less, preferably 600 nm or less, preferably 500 nm or less.

Any suitable extraction method and extraction solvent may be used. In one embodiment, after obtaining a dried powder of the beetroot, the beetroot is subjected to an extraction method to obtain the beetroot extract. Suitable extraction solvents may be water, ethanol, acetone, methanol, acetonitrile, dimethyl sulfoxide (DMSO), chloroform, n-hexane, ethyl acetate, toluene, dichloromethane (DCM), isopropanol, or any other suitable extraction solvent. In one embodiment, the extraction solvent is ethanol, preferably 50% ethanol, preferably 55% ethanol, preferably 60% ethanol, preferably 65% ethanol, most preferably 70% ethanol. The beetroot extract obtained is further used to prepare the food preservative by method as described in FIG. 1A.

Beetroot is also rich in bioactive compounds such as phenols and flavonoids. In one embodiment, the extract of the beetroot comprises at least one selected from the group consisting of a phenol and a flavonoid. In one embodiment, the extract of the beetroot comprises a phenol. In another embodiment, the extract of the beetroot comprises a flavonoid. In yet another embodiment, the extract of the beetroot comprises a phenol and a flavonoid. Phenols present in beetroot include, but are not limited to, epicatechin, gallic acid, quercetin-3-O-rutinoside, chlorogenic acid, kaempferol, vanillin, vanillic acid, hydroxybenzoic acid, and ferulic acid. Flavonoids present in beetroot include, but are not limited to, rhamnetin, rhamnocitrin, astragalin, tiliroside, quercetin, and betagarin. In one embodiment, the beetroot extract has a total phenol content (TPC) of 250 to 450 mg gallic acid equivalents per 100 grams of dry weight (mg GAE/100 g DW), preferably 260 to 440 mg GAE/100 g DW, preferably 270 to 430 mg GAE/100 g DW, preferably 280 to 420 mg GAE/100 g DW, preferably 290 to 410 mg GAE/100 g DW, preferably 300 to 400 mg GAE/100 g DW, preferably 310 to 390 mg GAE/100 g DW, preferably 320 to 380 mg GAE/100 g DW, preferably 330 to 370 mg GAE/100 g DW, preferably 340 to 360 mg GAE/100 g DW, preferably 340 to 350 mg GAE/100 g DW, most preferably about 347 mg GAE/100 g DW. In one embodiment, the beetroot extract has a total flavonoid content (TFC) in the range of 100 to 300 mg GAE/100 g DW, preferably 110 to 290 mg GAE/100 g DW, preferably 120 to 280 mg GAE/100 g DW, preferably 130 to 270 mg GAE/100 g DW, preferably 140 to 260 mg GAE/100 g DW, preferably 150 to 250 mg GAE/100 g DW, preferably 160 to 240 mg GAE/100 g DW, preferably 170 to 230 mg GAE/100 g DW, preferably 180 to 220 mg GAE/100 g DW, preferably 190 to 210 mg GAE/100 g DW, preferably 190 to 200 mg GAE/100 g DW, most preferably about 194 mg GAE/100 g DW.

In another embodiment, the nanocomposite is obtained from a red cabbage extract. In some embodiments, white cabbage, green cabbage, cannonball cabbage, Danish Ballhead, pointed cabbage, savoy cabbage, napa cabbage, bak choy, choy sum, January King, Tuscan cabbage, may also be used, alone or in combination with red cabbage. In one embodiment, the red cabbage has a moisture content of 80 to 100 wt. % based on the total weight of the red cabbage, preferably 81 to 99 wt. %, preferably 82 to 98 wt. %, preferably 83 to 97 wt. %, preferably 84 to 96 wt. %, preferably 85 to 95 wt. %, preferably 86 to 94 wt. %, preferably 87 to 93 wt. %, preferably 88 to 92 wt. %, preferably 89 to 92 wt. %, preferably 90 to 92 wt. %, preferably 91 to 92 wt. %, most preferably 91.5 wt. %. In one embodiment, the beetroot has a crude protein of 1 to 5 wt. % based on the total weight of the red cabbage, preferably 1.2 to 4.8 wt. %, preferably 1.4 to 4.6 wt. %, preferably 1.6 to 4.4 wt. %, preferably 1.8 to 4.2 wt. %, preferably 2 to 4 wt. %, preferably 2 to 3.8 wt. %, preferably 2 to 3.6 wt. %, preferably 2 to 3.4 wt. %, preferably 2 to 3.2 wt. %, preferably 2 to 3 wt. %, preferably 2 to 2.8 wt. %, preferably 2 to 2.6 wt. %, preferably 2 to 2.4 wt. %, preferably 2 to 2.2 wt. %, most preferably about 2.02 wt. %. In one embodiment, the red cabbage has a crude fat of about 0.025 to 0.2 wt. % based on the total weight of the red cabbage, preferably 0.05 to 0.175 wt. %, preferably 0.075 to 0.150 wt. %, preferably 0.1 to 0.125 wt. %, most preferably 0.1 wt. %. In one embodiment, the red cabbage has an ash content of about 1 to 5 wt. % based on the total weight of the red cabbage, preferably 1 to 4.5 wt. %, preferably 1 to 4 wt. %, preferably 1 to 3.5 wt. %, preferably 1 to 3 wt. %, preferably 1 to 2.5 wt. %, preferably 1 to 2 wt. %, preferably 1 to 1.5 wt. %, most preferably 1.02%. In one embodiment, the red cabbage has a carbohydrate content of about 1.5 to 10 wt. % based on the total weight of the red cabbage, preferably 2 to 9.5 wt. %, preferably 2.5 to 8 wt. %, preferably 3 to 7.5 wt. %, preferably 3.5 to 7 wt. %, preferably 4 to 6.5 wt. %, preferably 4.5 to 6 wt. %, preferably 5 to 5.5 wt. %, most preferably 5.27 wt. %.

Prior to extraction, the red cabbage may be dried and ground to obtain a dry powder. The extract of the red cabbage can be prepared from any part including the leaves, stem, or a combination thereof. In one embodiment, the red cabbage is dried in an oven for 12 to 36 hours, preferably 14 to 36 h, preferably 16 to 36 h, preferably 18 to 36 h, preferably 20 to 36 h, preferably 22 to 36 h, most preferably 24 to 36 h. In one embodiment, the red cabbage is dried in an oven at a temperature of preferably 10 to 70° C., preferably 15 to 65° C., preferably 20 to 60° C., preferably 25 to 55° C., most preferably 30 to 50° C. Other methods of drying known in the art may also be utilized, with the method of drying affecting the drying time. In another embodiment, the dried red cabbage is ground to obtain a powder having an average particle size of 1000 nm or less, preferably 900 nm or less, preferably 800 nm or less, preferably 700 nm or less, preferably 600 nm or less, preferably 500 nm or less, preferably 400 nm or less, preferably 300 nm or less, preferably 200 nm or less, preferably 100 nm or less. In another embodiment, the dried red cabbage is ground to obtain a powder having an average particle size of 80 nm or less.

In one embodiment, after obtaining a dried powder of the red cabbage, the red cabbage is subjected to an extraction method to obtain the red cabbage extract. Suitable extraction solvents may be water, ethanol, acetone, methanol, acetonitrile, dimethyl sulfoxide (DMSO), chloroform, n-hexane, ethyl acetate, toluene, dichloromethane (DCM), isopropanol, or any other suitable extraction solvent. In one embodiment, the extraction solvent is ethanol, preferably 50% ethanol, preferably 55% ethanol, preferably 60% ethanol, preferably 65% ethanol, most preferably 70% ethanol. The red cabbage extract obtained is further used to prepare the food preservative by method as described in FIG. 1A.

Red cabbage is also rich in bioactive compounds such as phenols and flavonoids. In one embodiment, the extract of the red cabbage comprises at least one selected from the group consisting of a phenol and a flavonoid. In one embodiment, the extract of the red cabbage comprises a phenol. In another embodiment, the extract of the red cabbage comprises a flavonoid. In yet another embodiment, the extract of the red cabbage comprises a phenol and a flavonoid. Phenols present in red cabbage include, but are not limited to, sinapic acid, hydroxycinnamic acid, ferulic acid, and p-coumaric acid. Flavonoids present in red cabbage include, but are not limited to, quercetin, apigenin, and cyanidin. In one embodiment, the red cabbage extract has a TPC of 500 to 700 mg GAE/100 g DW, preferably 510 to 690 mg GAE/100 g DW, preferably 520 to 680 mg GAE/100 g DW, preferably 530 to 670 mg GAE/100 g DW, preferably 540 to 660 mg GAE/100 g DW, preferably 550 to 650 mg GAE/100 g DW, preferably 560 to 640 mg GAE/100 g DW, preferably 570 to 630 mg GAE/100 g DW, preferably 580 to 620 mg GAE/100 g DW, preferably 590 to 610 mg GAE/100 g DW, preferably 590 to 600 mg GAE/100 g DW, most preferably about 598 mg GAE/100 g DW. In one embodiment, the red cabbage extract has a total flavonoid content TFC of 200 to 300 mg GAE/100 g DW, preferably 210 to 290 mg GAE/100 g DW, preferably 220 to 280 mg GAE/100 g DW, preferably 230 to 270 mg GAE/100 g DW, preferably 240 to 260 mg GAE/100 g DW, preferably 250 to 260 mg GAE/100 g DW, most preferably 256 mg GAE/100 g DW.

The food preservative is characterized by a Fourier-Transform Infrared (FTIR) pattern including a broad peak at 3500 to 3000 $cm^{-1}$, and a series of three peaks at 900 to 1200 $cm^{-1}$. In some embodiments, the food preservative is a crystalline solid and comprises crystallites having a crystallite size of 0.15 to 0.26 nm, preferably 0.16 to 25 nm, preferably 0.17 to 24 nm, preferably 0.18 to 0.24 nm, preferably 0.19 to 24 nm, preferably 0.20 to 24 nm, preferably 0.21 to 0.24 nm, preferably 0.22 to 24 nm, most preferably 0.23 to 0.24 nm.

Figure 1B:
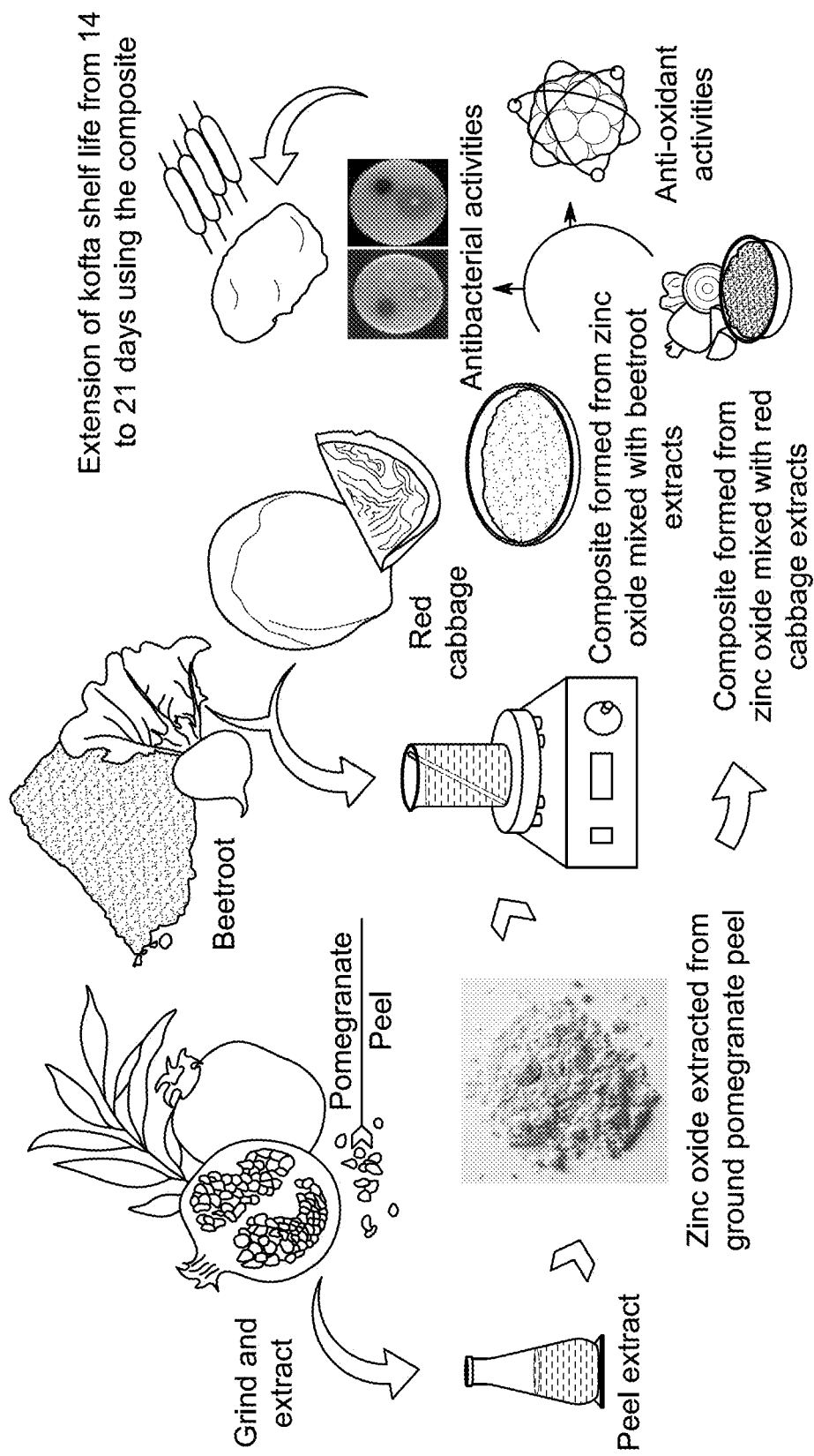
FIG. 1B illustrates a schematic diagram of an exemplary process for fabricating a food preservative from pomegranate peel, red cabbage, and beetroot extracts, according to certain embodiments.

Referring to FIG. 1A, a method 50 of fabricating food preservative is described. A schematic diagram of an exemplary process for fabricating a food preservative from pomegranate peel, red cabbage, and beetroot extracts is depicted in FIG. 1B. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 comprises preparing the pomegranate peel extract, then mixing the pomegranate peel extract with a hydrated zinc salt to obtain zinc oxide nanoparticles. In some embodiments, after grinding, the dried pomegranate peel powder is treated with a polar protic solvent to obtain the pomegranate peel extract. Suitable examples of the polar protic solvent include, but are not limited to, water, ethanol, methanol, ammonia, acetic acid, formic acid, and hydrogen fluoride. In a preferred embodiment, the polar protic solvent is ethanol, preferably 50% ethanol, preferably 60% ethanol, preferably 70% ethanol, preferably 80% ethanol, preferably 90% ethanol, preferably 95% ethanol, preferably 98% ethanol, preferably 99% ethanol, preferably absolute ethanol. In a preferred embodiment, the polar protic solvent is 70% ethanol. In some embodiments, the pomegranate peel extract may be further dried using a drying appliance, such as a rotary drier. In some embodiments, the extract may be lyophilized to obtain a powder form.

In another embodiment, the pomegranate peel extract is mixed with a hydrated zinc salt to obtain zinc oxide nanoparticles. Suitable examples of the hydrated zinc salt include, but are not limited to, zinc sulfate heptahydrate, zinc sulfate hexahydrate, zinc acetate dihydrate, zinc nitrate hexahydrate, and zinc chloride dihydrate. In a preferred embodiment, the hydrated zinc salt is zinc acetate dihydrate.

When the pomegranate peel extract is mixed with the hydrated zinc salt, the bioactive compounds present in the pomegranate peel reduce the zinc ions in the hydrated zinc salt to zinc oxide nanoparticles. In some embodiments, this step is carried out at room temperature, although it is possible to perform this step at slightly elevated or higher temperatures to speed up the reaction.

At step 54, the method 50 comprises grinding at least one of the beetroot and the red cabbage to obtain a powder, then calcining the powder obtain the nanocomposite. In some embodiments, the powder has an average particle size of 100 nm or less, preferably 99 nm or less nm, preferably 98 nm or less, preferably 97 nm or less, preferably 96 nm or less, preferably 95 nm or less, preferably 94 nm or less, preferably 93 nm or less, preferably 92 nm or less, preferably 91 nm or less, preferably 90 nm or less, preferably 89 nm or less, preferably 88 nm or less, preferably 87 nm or less, preferably 86 nm or less, preferably 85 nm or less, preferably 84 nm or less, preferably 83 nm or less, preferably 82 nm or less, preferably 81 nm or less, most preferably 80 nm or less.

The powder is further calcined by heating it to a high temperature, under a restricted supply of ambient oxygen. This is performed to remove impurities or volatile substances and to incur thermal decomposition. In one embodiment, the calcination is carried out in a furnace preferably equipped with a temperature control system, which may provide a heating rate of up to 50 degrees Celsius per minute (° C./min), preferably up to 40° C./min, preferably up to 30° C./min, preferably up to 20° C./min, preferably up to 10° C./min, preferably up to 5° C./min, preferably up to 2° C./min, most preferably up to 1° C./min. In some embodiments, the calcining is performed at 350 to 850° C., preferably 360 to 845° C., 365 to 840° C., 370 to 835° C., preferably 375 to 830° C., preferably 380 to 825° C., preferably 385 to 820° C., preferably 390 to 815° C., preferably 395 to 810° C., most preferably 400 to 800° C. In some embodiments, the powder is calcined for 1 to 5 h to obtain the nanocomposite, preferably 1.5 to 4.5 h, preferably 2 to 4 h, preferably 2 to 3.5 h, most preferably 2 to 3 h to obtain the nanocomposite.

At step 56, the method 50 comprises combining the nanocomposite with the zinc oxide nanoparticles to obtain the food preservative. The weight (w/w) ratio of the nanocomposite to the food preservative is in the range of 1:5 to 5:1, preferably 1:4 to 4:1, preferably 1:3 to 3:1, preferably 1:2 to 2:1, most preferably 1:1.

In one embodiment, the food preservative is added to a food product to prevent contamination of the food product. The food product may be, but is not limited to, perishable foods and beverages such as meat, poultry, fish, dairy products, juices, fresh produce, frozen foods, frozen snacks, and baked goods such as cookies, cereal, and nutrition bars.

Antioxidants work to prevent food decomposition by slowing or stopping the oxidation process. Antioxidants donate hydrogen atoms to quench free radicals, which are responsible for lipid oxidation and food decomposition Antioxidants work on DPPH (2,2-diphenyl-1-picryl-hydrazyl) by donating an electron or hydrogen atom to the DPPH radical, which reduces it to a colorless or pale-yellow compound. This reaction, therefore, may be used as a way to determine the antioxidant activity of a substance. In a DPPH assay, the $IC_{50}$ is the concentration of an antioxidant-containing substance required to reduce the initial DPPH concentration by 50%. A lower $IC_{50}$ value, therefore, indicates a more potent antioxidant. In some embodiments, the food preservative has a half maximal inhibitory concentration ($IC_{50}$) of DPPH radicals of 4.00 mg/mL or less, preferably 3.9 mg/mL or less, preferably 3.8 mg/mL or less, preferably at least 3.7 mg/mL or less, preferably 3.6 mg/mL or less, preferably 3.5 mg/mL or less, preferably at least 3.4 mg/mL or less, preferably 3.3 mg/mL or less, preferably 3.2 mg/mL or less, preferably at least 3.1 mg/mL or less, preferably 3 mg/mL or less, preferably 2.9 mg/mL or less, preferably 2.8 mg/mL or less, preferably 2.7 mg/mL or less, preferably 2.6 mg/mL or less, preferably 2.5 mg/mL or less, preferably 2.4 mg/mL or less, preferably 2.3 mg/mL or less, preferably 2.2 mg/mL or less, preferably 2.1 mg/mL or less, preferably 2 mg/mL or less. In a specific embodiment, the food preservative, comprising the nanocomposite obtained from beetroot extract, has a $IC_{50}$ of DPPH radicals of 3.013 mg/mL. In a specific embodiment, the food preservative, comprising the nanocomposite obtained from red cabbage extract, has a $IC_{50}$ of DPPH radicals of 1.93 mg/mL.

In some embodiments, the food preservative, comprising a nanocomposite from at least one of the red cabbage extract and the beetroot extract, has an $IC_{50}$ which is at least 5% less than a food preservative without a nanocomposite from at least one of the red cabbage extract and the beetroot extract. In some embodiments, the food preservative, comprising a nanocomposite from at least one of the red cabbage extract and the beetroot extract, has an $IC_{50}$ which is at least 6% less, preferably at least 7% less, preferably at least 8% less, preferably at least 9% less, preferably at least 10% less, preferably at least 11% less, preferably at least 12% less, preferably at least 13% less, preferably at least 14% less, preferably at least 15% less, preferably at least 16% less, preferably at least 17% less, preferably at least 18% less, most preferably at least 19% less than a food preservative without a nanocomposite from at least one of the red cabbage extract and the beetroot extract.

In some embodiments, the food preservative has a DPPH radical scavenging rate of at least 45% or more, preferably at least 50% or more, preferably at least 55% or more, preferably at least 60% or more, preferably at least 65% or more, preferably at least 70% or more, preferably at least 75% or more, preferably at least 80% or more, preferably at least 85% or more, preferably at least 90% or more, most preferably at least 92% or more. In one embodiment, the food preservative, comprising a nanocomposite from the red cabbage extract, has a DPPH radical scavenging rate of at least 60%. In one embodiment, the food preservative, comprising a nanocomposite from the beetroot extract, has a DPPH radical scavenging rate of at least 90%.

In some embodiments, a method of inhibiting the growth of at least one bacterium and/or at least one fungus using the food preservative is described. The bacterium may be a gram-positive and/or gram-negative bacteria group, and the fungus is at least one of a yeast, a mold, and a saprotroph. In an embodiment, the bacterium is at least one of *Staphylococcus aureus, Staphylococcus pneumoniae, Listeria monocytogenes, Haemophilus influenza, Bacillus subtilis,* and *Escherichia coli*. In some embodiments, the fungus is at least one of *Candida albicans, Aspergillus flavus, Mucor circinelloides, Aspergillus fumigatus, Penicillium notatum,* and *Aspergillus niger.*

The food preservative is effective against gram-positive and gram-negative bacteria, fungi, and yeast. Antimicrobial activity may be measured by performing the Kirby-Bauer Test, also known as the zone of inhibition test. The zone of inhibition is the area around an antibiotic disc where microbes are unable to grow. To perform the Kirby-Bauer Test, the targeted spread bacteria or fungal cells are spread on an agar plate, then filter discs soaked in the sample being tested are placed on the agar plate. The plates are then incubated for 18 to 24 hours. A caliper is then used to measure the diameter of the inhibition zone from edge to edge in millimeters. The size of the zone of inhibition indicates how effective the antibiotic is at killing microbes. A larger zone of inhibition means the antibiotic was more effective.

In some embodiments, the food preservative has an inhibition zone diameter of at least 6 mm, preferably at least 7 mm, preferably at least 8 mm, preferably at least 9 mm, preferably at least 10 mm, preferably at least 11 mm, preferably at least 12 mm, preferably at least 13 mm, preferably at least 14 mm, preferably at least 15 mm, preferably at least 16 mm, preferably at least 17 mm, preferably at least 18 mm, most preferably at least 19 mm against *Staphylococcus aureus* gram-positive bacteria at a concentration of 50 to 100 µL/well. In a specific embodiment, the food preservative, comprising the nanocomposite from the red cabbage extract, has an inhibition zone diameter of at least 13 mm against *Staphylococcus aureus* at a concentration of 50 to 100 µL/well. In a specific embodiment, the food preservative, comprising the nanocomposite from the beetroot extract, has an inhibition zone diameter of at least 6 mm against *Staphylococcus aureus* at a concentration of 50 to 100 µL/well.

In some embodiments, the food preservative has an inhibition zone diameter of at least 8 mm, preferably at least 9 mm, preferably at least 10 mm, preferably at least 11 mm, preferably at least 12 mm, preferably at least 13 mm, preferably at least 14 mm, preferably at least 15 mm, most preferably at least 16 mm against *Bacillus cereus* at a concentration of 50 to 100 µL/well. In a specific embodiment, the food preservative, comprising the nanocomposite from the red cabbage extract, has an inhibition zone diameter of at least 16 mm against *Bacillus cereus* bacteria at a concentration of 50 to 100 µL/well. In a specific embodiment, the food preservative, comprising the nanocomposite from the beetroot extract, has an inhibition zone diameter of at least 6 mm against *Bacillus cereus* bacteria at a concentration of 50 to 100 µL/well.

In some embodiments, the food preservative has an inhibition zone diameter of at least 8 mm, preferably at least 9 mm, preferably at least 10 mm, preferably at least 11 mm, preferably at least 12 mm, preferably at least 13 mm, preferably at least 14 mm, preferably at least 15 mm, most preferably at least 16 mm against *Bacillus cereus* at a concentration of 50 to 100 µL/well. In a specific embodiment, the food preservative, comprising the nanocomposite from the red cabbage extract, has an inhibition zone diameter of at least 16 mm against *Bacillus cereus* bacteria at a concentration of 50 to 100 µL/well. In a specific embodiment, the food preservative, comprising the nanocomposite from the beetroot extract, has an inhibition zone diameter of at least 6 mm against *Bacillus cereus* bacteria at a concentration of 50 to 100 µL/well.

In some embodiments, the food preservative has an inhibition zone diameter of at least 10 mm, preferably at least 11 mm, preferably at least 12 mm, preferably at least 13 mm, preferably at least 14 mm, preferably at least 15 mm, preferably at least 16 mm, preferably at least 17 mm, most preferably at least 18 mm against *Escherichia coli* at a concentration of 50 to 100 µL/well. In a specific embodiment, the food preservative, comprising the nanocomposite from the red cabbage extract, has an inhibition zone diameter of at least 10 mm against *Escherichia coli* bacteria at a concentration of 50 to 100 µL/well. In a specific embodiment, the food preservative, comprising the nanocomposite from the beetroot extract, has an inhibition zone diameter of at least 11 mm against *Escherichia coli* bacteria at a concentration of 75 to 100 µL/well.

In some embodiments, the food preservative has an inhibition zone diameter of at least 9 mm, preferably at least 10 mm, preferably at least 11 mm, preferably at least 12 mm, preferably at least 13 mm, most preferably at least 14 mm against *Pseudomonas aeruginosa* at a concentration of 50 to 100 µL/well. In a specific embodiment, the food preservative, comprising the nanocomposite from the red cabbage extract, has an inhibition zone diameter of at least 9 mm against *Pseudomonas aeruginosa* bacteria at a concentration of 50 to 100 µL/well. In a specific embodiment, the food preservative, comprising the nanocomposite from the beetroot extract, has an inhibition zone diameter of at least 9 mm against *Pseudomonas aeruginosa* bacteria at a concentration of 50 to 100 µL/well.

In some embodiments, the food preservative has an inhibition zone diameter of at least 12 mm, preferably at least 13 mm, most preferably at least 14 mm against *Salmonella typhi* at a concentration of 50 to 100 µL/well. In a specific embodiment, the food preservative, comprising the nanocomposite from the red cabbage extract, has an inhibition zone diameter of at least 12 mm against *Salmonella typhi* bacteria at a concentration of 50 to 100 µL/well. In a specific embodiment, the food preservative, comprising the nanocomposite from the beetroot extract, has an inhibition zone diameter of at least 14 mm against *Salmonella typhi* bacteria at a concentration of 50 to 100 µL/well.

In some embodiments, the food preservative has an inhibition zone diameter of at least 6 mm, preferably at least 7 mm, preferably at least 8 mm, preferably at least 9 mm, preferably at least 10 mm, preferably at least 11 mm, preferably at least 12 mm, preferably at least 13 mm, most preferably at least 14 mm against *Aspergillus niger* at a concentration of 50 to 100 µL/well. In a specific embodiment, the food preservative, comprising the nanocomposite from the red cabbage extract, has an inhibition zone diameter of at least 11 mm against *Aspergillus niger* fungus at a concentration of 50 to 100 µL/well. In a specific embodiment, the food preservative, comprising the nanocomposite from the beetroot extract, has an inhibition zone diameter of at least 6 mm against *Aspergillus niger* fungus at a concentration of 50 to 100 µL/well.

In some embodiments, the food preservative has an inhibition zone diameter of at least 4 mm, preferably at least 5 mm, preferably at least 6 mm, preferably at least 7 mm, preferably at least 8 mm, preferably at least 9 mm, preferably at least 10 mm, preferably at least 11 mm, preferably at least 12 mm, preferably at least 13 mm, most preferably at least 14 mm against *Penicillium reqfortii* at a concentration of 50 to 100 µL/well. In a specific embodiment, the food preservative, comprising the nanocomposite from the red cabbage extract, has an inhibition zone diameter of at least 12 mm against *Penicillium reqfortii* fungus at a concentration of 50 to 100 L/well. In a specific embodiment, the food preservative, comprising the nanocomposite from the beetroot extract, has an inhibition zone diameter of at least 4 mm against *Penicillium reqfortii* fungus at a concentration of 50 to 100 µL/well.

In some embodiments, a method of reducing a biofilm formation is described. The method comprises contacting the food preservative to a surface. Upon contacting the surface, the food preservative inhibits or kills the growth of at least one bacterium (gram-positive or gram-negative bacterium) and/or at least one fungus by inhibiting its initial adhesion phase, thereby protecting the surface from biofilm formation. In some embodiments, the biofilm formation comprises at least one selected from the group consisting of *Staphylococcus aureus, Staphylococcus pneumoniae, Listeria monocytogenes, Haemophilus influenza, Bacillus subtlis, Escherichia coli, Aspergillus flavus, Aspergillus niger, Aspergillus fumigatus, Penicillium notatum*, and *Candida albicans*. In some embodiments, the surface is selected from a group consisting of a living tissue surface, an industrial or potable water system pipe surface, a natural aquatic system surface, and an indwelling medical device surface. The surface also refers to the interior or exterior of pipes, for example, drains, swimming pools, tanks (e.g., for aquaculture), purification filters, toilet bowls, sinks, and greenhouse surfaces. It also includes water, such as from a drinking trough. In some embodiments, the surface is of a medical device, such as prosthetics (hip implants, dental implants, prosthetic joint, a voice prosthetic, a penile prosthetic) a mechanical heart valve, a cardiac pacemaker, an arteriovenous shunt, a schleral buckle, catheters (e.g., central venous catheter, an intravascular catheter, a urinary catheter, a Hickman catheter, a peritoneal dialysis catheter, an endrotracheal catheter), tympanostomy tube, a tracheostomy tube, a surgical suture, a bone anchor, a bone screw, an intraocular lens, a contact lens, an intrauterine device, an aortofemoral graft, or a vascular graft. Other infections from medical devices include those from abdominal drains, biliary tract stents, breast implants, cardiac pacemakers, cerebrospinal fluid shunts, contact lenses, defibrillators, dentures, electrical dialyzers, endotracheal tubes, indwelling urinary catheters, intrauterine devices, intravenous catheters, joint prostheses, mechanical heart valves, nephrostomy tubes, orthopedic implants, peritoneal dialysis catheters, prosthetic heart valves, prosthetic joints allosplastic orthopedic devices, tissue fillers, urethral stents, vascular prostheses, ventilator-associated pneumonia, ventricular assist devices, ventricular derivations, ventricular shunts, and voice prostheses. In some embodiments, the surface is of a surgical device, such as a clamp, forceps, scissor, skin hook, tubing, needle, retractor, scaler, drill, chisel, rasp, or saw.

In some embodiments, the food preservative inhibits a biofilm formation of *Staphylococcus aureus* bacteria by at least 80%, preferably at least 81%, preferably at least 82%, preferably at least 83%, preferably at least 84%, preferably at least 85%, preferably at least 86%, preferably at least 87%, preferably at least 88%, most preferably at least 89%. In a specific embodiment, the food preservative, comprising the nanocomposite from the red cabbage extract, inhibits a biofilm formation of *Staphylococcus aureus* bacteria by at least 88.57%. In a specific embodiment, the food preservative, comprising the nanocomposite from the beetroot extract, inhibits a biofilm formation of *Staphylococcus aureus* bacteria by at least 89.4%.

In some embodiments, the food preservative inhibits a biofilm formation of *Staphylococcus pneumoniae* bacteria by at least 80%, preferably at least 81%, preferably at least 82%, preferably at least 83%, most preferably at least 84%. In a specific embodiment, the food preservative, comprising the nanocomposite from the red cabbage extract, inhibits a biofilm formation of *Staphylococcus pneumoniae* bacteria by at least 84.13%. In a specific embodiment, the food preservative, comprising the nanocomposite from the beetroot extract, inhibits a biofilm formation of *Staphylococcus pneumoniae* bacteria by at least 84.94%.

In some embodiments, the food preservative inhibits a biofilm formation of *Listeria monocytogenes* bacteria by at least 70%, preferably at least 71%, preferably at least 72%, preferably at least 73%, preferably at least 74%, preferably at least 75%, preferably at least 76%, preferably at least 77%, preferably at least 78%, most preferably at least 79%. In a specific embodiment, the food preservative, comprising the nanocomposite from the red cabbage extract, inhibits a biofilm formation of *Listeria monocytogenes* bacteria by at least 80.7%. In a specific embodiment, the food preservative, comprising the nanocomposite from the beetroot extract, inhibits a biofilm formation of *Listeria monocytogenes* bacteria by at least 79.07%.

In some embodiments, the food preservative inhibits a biofilm formation of *Haemophilus* influenza bacteria by at least 65%, preferably at least 66%, preferably at least 67%, preferably at least 72 preferably at least 73%, preferably at least 74%, preferably at least 75%, preferably at least 76%, preferably at least 77%, most preferably at least 78%. In a specific embodiment, the food preservative, comprising the nanocomposite from the red cabbage extract, inhibits a biofilm formation of *Haemophilus* influenza bacteria by at least 75.73%. In a specific embodiment, the food preservative, comprising the nanocomposite from the beetroot extract, inhibits a biofilm formation of *Staphylococcus aureus* bacteria by at least 78.39%.

In some embodiments, the food preservative inhibits a biofilm formation of *Bacillus subtlis* bacteria by at least 64%, preferably at least 65%, preferably at least 66%, preferably at least 67%, preferably at least 68%, preferably at least 69%, preferably at least 70%, preferably at least 71%, preferably at least 72%, preferably at least 73%, preferably at least 74%, preferably at least 75%, preferably at least 76%, preferably at least 77%, preferably at least 78%, preferably at least 79%. In a specific embodiment, the food preservative, comprising the nanocomposite from the red cabbage extract, reduces a biofilm formation of *Bacillus subtlis* bacteria by at least 79.64%. In a specific embodiment, the food preservative, comprising the nanocomposite from the beetroot extract, reduces a biofilm formation of *Bacillus subtlis* bacteria by at least 65.22%.

In some embodiments, the food preservative inhibits a biofilm formation of *Escherichia coli* bacteria by at least 40%, preferably at least 41%, preferably at least 42%, preferably at least 43%, preferably at least 44%, preferably at least 45%, preferably at least 46%, preferably at least 47%, most preferably at least 48%. In a specific embodiment, the food preservative, comprising the nanocomposite from the red cabbage extract, reduces a biofilm formation of *Escherichia coli* bacteria by at least 46.63%. In a specific embodiment, the food preservative, comprising the nanocomposite from the beetroot extract, reduces a biofilm formation of *Escherichia coli* bacteria by at least 48.35%.

In some embodiments, the food preservative inhibits a biofilm formation of *Aspergillus flavus* fungus by at least 45%, preferably at least 46%, preferably at least 47%, preferably at least 48%, preferably at least 49%, preferably at least 50%, preferably at least 51%, preferably at least 52%, preferably at least 53%, preferably at least 54%, preferably at least 55%, preferably at least 56%, preferably at least 57%, preferably at least 58%, most preferably at least 59%. In a specific embodiment, the food preservative, comprising the nanocomposite from the red cabbage extract, reduces a biofilm formation of *Aspergillus flavus* fungus by at least 59.25%. In a specific embodiment, the food preservative, comprising the nanocomposite from the beetroot extract, reduces a biofilm formation of *Aspergillus flavus* fungus by at least 51.84%.

In some embodiments, the food preservative inhibits a biofilm formation of *Aspergillus niger* fungus by at least 40%, preferably at least 41%, preferably at least 42%, preferably at least 43%, preferably at least 44%, preferably at least 45%, preferably at least 46%, most preferably at least 47%. In a specific embodiment, the food preservative, comprising the nanocomposite from the red cabbage extract, reduces a biofilm formation of *Aspergillus niger* fungus by at least 43.10%. In a specific embodiment, the food preservative, comprising the nanocomposite from the beetroot extract, reduces a biofilm formation of *Aspergillus niger* fungus by at least 47.24%.

In some embodiments, the food preservative inhibits a biofilm formation of *Aspergillus fumigatus* fungus by at least 30%, preferably at least 31%, preferably at least 32%, preferably at least 33%, preferably at least 34%, preferably at least 35%, most preferably at least 36%. In a specific embodiment, the food preservative, comprising the nanocomposite from the red cabbage extract, reduces a biofilm formation of *Aspergillus fumigatus* fungus by at least 36.65%. In a specific embodiment, the food preservative, comprising the nanocomposite from the beetroot extract, reduces a biofilm formation of *Aspergillus fumigatus* fungus by at least 33.89%.

In some embodiments, the food preservative inhibits a biofilm formation of *Penicillium notatum* mold by at least 30%, preferably at least 31%, preferably at least 32%, preferably at least 33%, preferably at least 34%, preferably at least 35%, preferably at least 36%, preferably at least 37%, preferably at least 38%, preferably at least 39%, preferably at least 40%, preferably at least 41%, most preferably at least 42%. In a specific embodiment, the food preservative, comprising the nanocomposite from the red cabbage extract, reduces a biofilm formation of *Penicillium notatum* mold by at least 34.31%. In a specific embodiment, the food preservative, comprising the nanocomposite from the beetroot extract, reduces a biofilm formation of *Penicillium notatum* mold by at least 42.90%.

In some embodiments, the food preservative inhibits a biofilm formation of *Candida albicans* yeast by at least 55%, preferably at least 56%, preferably at least 57%, preferably at least 58%, preferably at least 59%, preferably at least 60%, preferably at least 61%. In a specific embodiment, the food preservative, comprising the nanocomposite from the red cabbage extract, reduces a biofilm formation of *Candida albicans* yeast by at least 60.12%. In a specific embodiment, the food preservative, comprising the nanocomposite from the beetroot extract, reduces a biofilm formation of *Candida albicans* yeast by at least 61.57%.

EXAMPLES

The following examples demonstrate a food preservative fabricated using natural plant-based nanoparticles. The examples are provided solely for illustration and are not to be construed as limitations of the present disclosure, as many variations thereof are possible without departing from the spirit and scope of the present disclosure.

Example 1: Characterization of the Food Preservative

Figure 2:
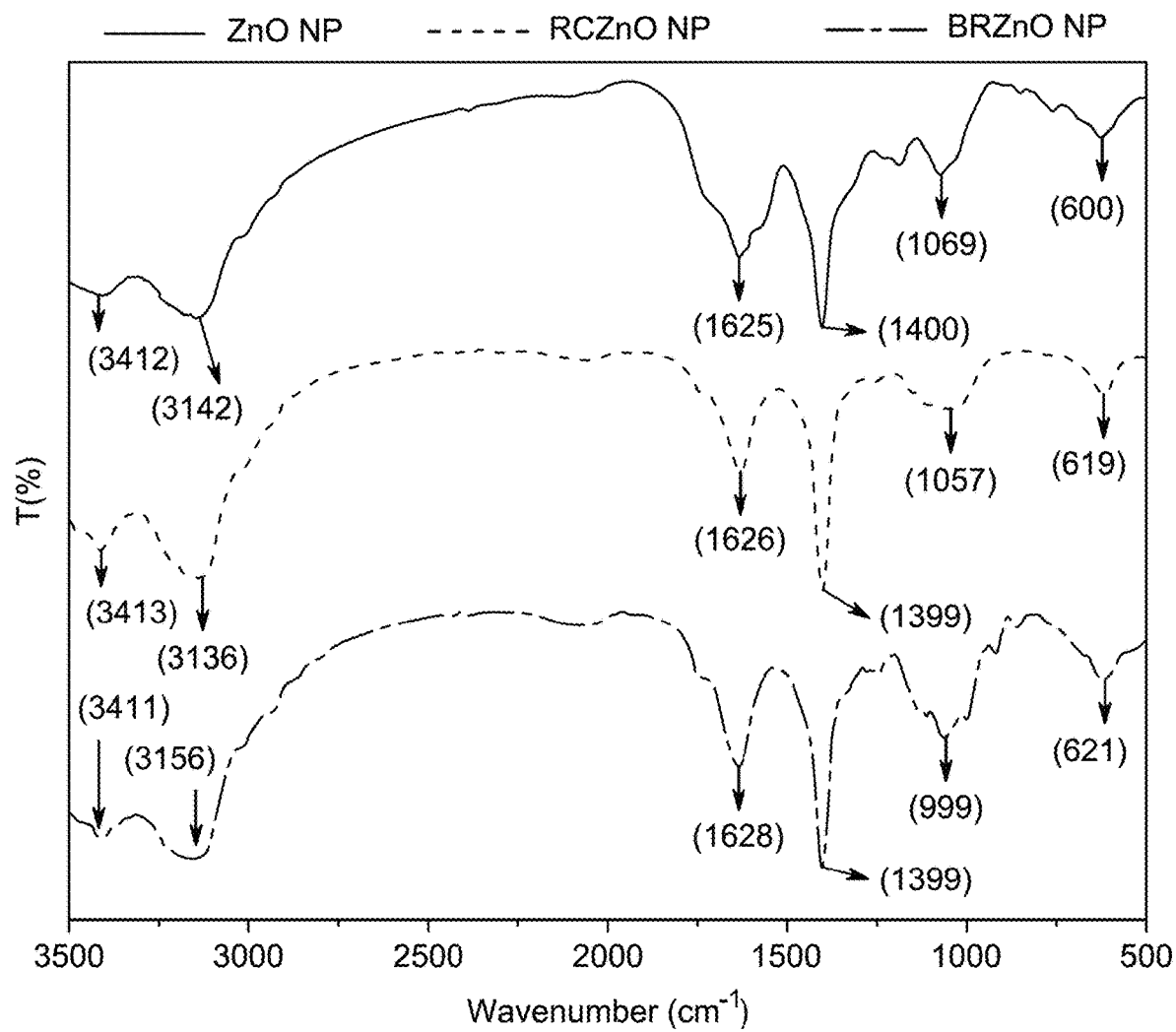
FIG. 2 depicts a Fourier-transform infrared (FTIR) spectra of zinc oxide nanoparticles (ZnO NP), red cabbage zinc oxide nanoparticles (RCZnO NP), and beetroot zinc oxide nanoparticles (BRZnO NP), according to certain embodiments.
Figure 3:
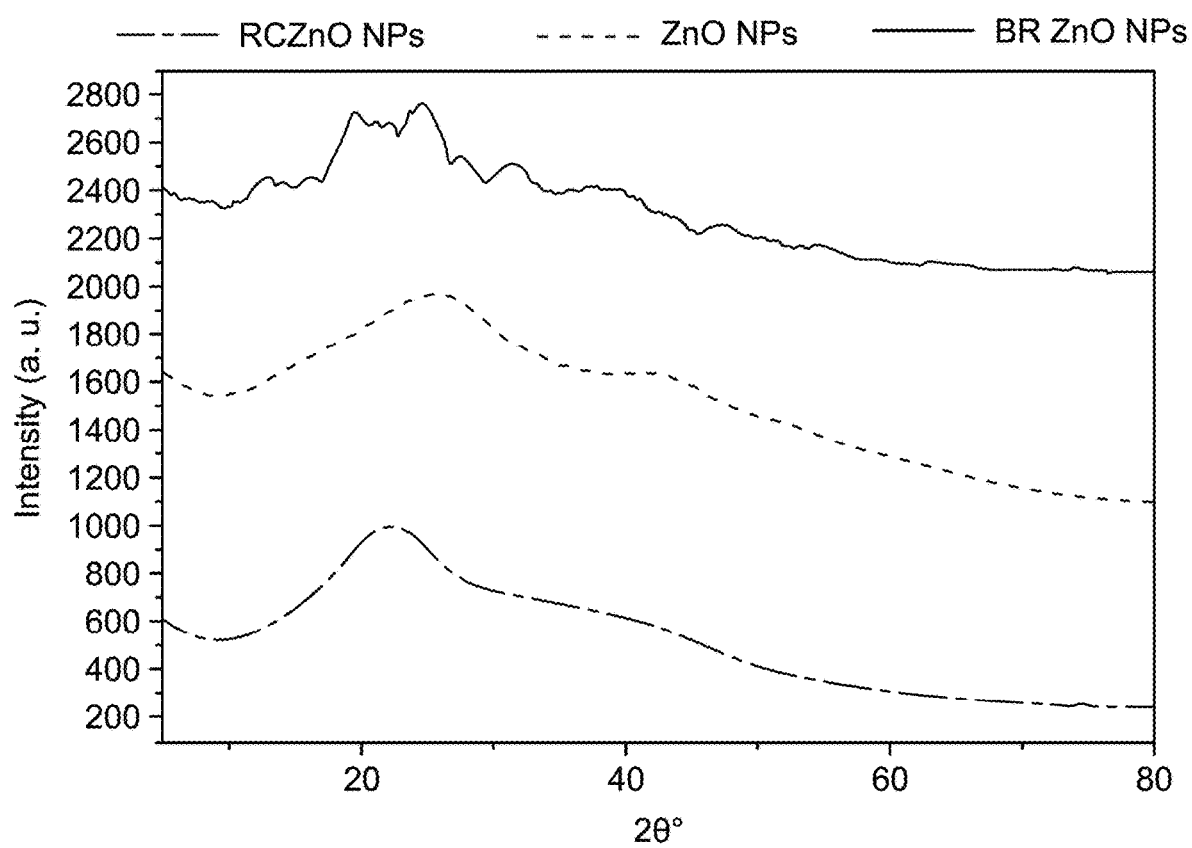
FIG. 3 shows X-ray diffraction (XRD) analysis for ZnO NP, RCZnO NP, and BRZnO NP, according to certain embodiments.

FIG. 2 shows Fourier transform infrared (FTIR) spectra for ZnO nanoparticles (NP), red cabbage (RC)ZnO NP, and beetroot (BR)ZnO NP, each exhibiting multiple bands in a range of about 4000 $cm^{-1}$ to 2500 $cm^{-1}$. In case of ZnO NP, two bands are present, a broad, small band at 3412 $cm^{-1}$ indicating O—H stretching, and a broad, medium band at 3142 $cm^{-1}$. In general, for a region of 600 $cm^{-1}$ to 1500 $cm^{-1}$, bands below 1700 $cm^{-1}$ correspond to C—H stretching for organic materials. It may be noted that in the 3500 $cm^{-1}$ to 3000 $cm^{-1}$ range, RCZnO NP shows increased peak density, while BRZnO NP has a wider peak. Further, ZnO NP shows a slight band displacement but lower peak density and width. In the region of 200 $cm^{-1}$ to 1500 $cm^{-1}$, similar bands are present, however with varying shape and number. Furthermore, between 900 $cm^{-1}$ to 1200 $cm^{-1}$, BRZnO NP exhibits three peaks with the most prominent at 999 $cm^{-1}$, RCZnO NP shows wide bands with a rightward shift, and ZnO NP has reduced band size and width. Beyond 100 $cm^{-1}$, no significant differences were noted, reinforcing the presence of natural resources in the samples. In addition, X-ray diffraction (XRD) analysis was employed to evaluate the structural composition of ZnO NPs/PP, RCZnO NPs, and BRZnO NPs, as shown in FIG. 3. The XRD analysis depicted that RCZnO NP exhibit amorphous crystalline formations. BR—ZnO NP patterns show increased peak intensities and shifts compared to ZnO NP/PP, demonstrating the formation of a ZnO nanocomposite. RCZnO NPs XRD patterns demonstrate enhanced crystallinity when compared to ZnO NPs/PP and BRZnO NP. The above stated observation may be corroborated by the red cabbage the strong antioxidant qualities of the RC powder. XRD data is utilized to determine the size of crystallites. The crystalline/crystallite size (D) of nanomaterials may be calculated using the Debye-Scherrer equation, as provided hereinafter:

$$D = K\lambda/\beta(\cos \theta)$$

The crystallite sizes for ZnO NPs/PP, RCZnO NPs, and BRZnO NPs were computed as 0.18 nm, 0.24 nm, and 0.23 nm, respectively, using the Debye-Scherrer equation. The calculated crystallite sizes correspond with the observed XRD patterns, where increased crystallinity is associated with larger crystal sizes.

Example 2: Chemical Composition of Beetroot (BR) and Red Cabbage (RC)

The chemical compositions of BR and RC are listed in Table 1. RC has higher moisture content at about 91.56%, when compared to BR at about 89.08%. Further, RC contains more crude protein at about 2.02% when compared to the crude protein content of BR at about 1.34%. However, BR has a higher crude fat content at about 0.37% than RC which is at about 0.10%, and BR shows slightly more ash at about 1.51%, when compared to RC which is at about 1.02%. Further, BR has higher carbohydrate content at about 7.7%, and provides more energy, with 39.49 kilocalories (kcal) per 100 g, compared to a carbohydrate content of 5.27% in the case of RC, which provided 30.07 kcal per 100 g. The above stated differences highlight the distinct nutritional profiles of BR and RC.

TABLE 1

Chemical composition of BR and RC based on weight

| Parameter (%) | Beetroot (BR) | Red cabbage (RC) |
|---|---|---|
| Moisture | 89.08 | 91.56 |
| Crude protein | 1.34 | 2.02 |
| Crude fat | 0.37 | 0.1 |
| Ash | 1.51 | 1.02 |
| Carbohydrates | 7.7 | 5.27 |
| Energy value (Kcal/100 g) | 39.49 | 30.07 |

Example 3: Comparison of Obtained BR and RC Extracts

Table 2 lists a comparison of the yield for BR and RC, in terms of TPC, TFC, DPPH %, and $IC_{50}$ values. The yield of BR extract is lower at 30.08%, compared to 34.58% for RC extract. In terms of TPC, BR extract has a TPC of 347.21 mg GAE/100 g DW, while RC extract has a higher TPC of 598 mg GAE/100 g DW. BR extract contains 194 mg QE/100 g of total flavonoids, whereas RC extract has a TFC of 256 mg QE/100 g DW. The antioxidant activity, measured by DPPH radical scavenging, is higher in RC extract at about 90.02%, when compared to BR extract which is at about 58.30%. Furthermore, the $IC_{50}$ value indicates the concentration required to scavenge 50% of DPPH radicals. The $IC_{50}$ is lower for RC extract, at about 2.09 mg/mL, when compared to BR extract which is at about 3.85 mg/mL.

TABLE 2

Comparative analysis of BR and RC extracts

| Parameter | BR extract | RC extract |
| --- | --- | --- |
| Yield extract (%) | 30.08 | 34.58 |
| TPC (mg GAE/100 g) dry weight | 347.21 | 598 |
| TFC (mg QE/100 g) dry weight | 194 | 256 |
| DPPH (%) | 58.3 | 90.02 |
| $IC_{50}$ (mg/mL) | 3.852 | 2.091 |

Figure 4:
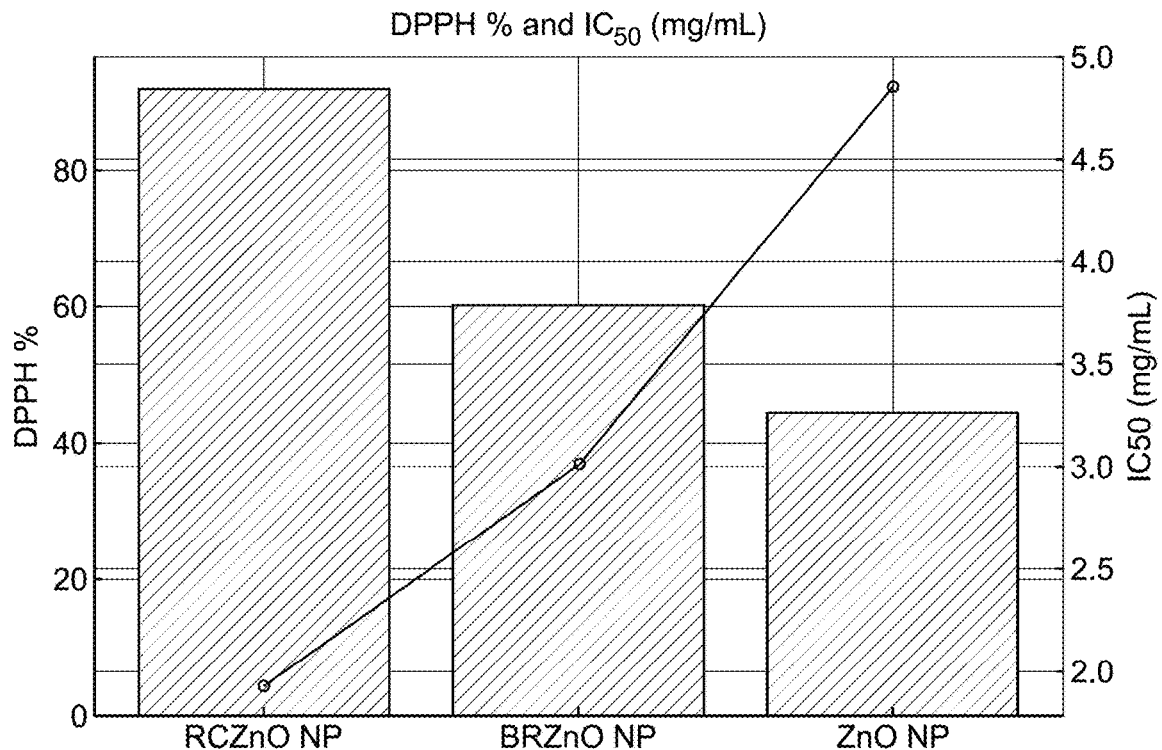
FIG. 4 is a graph depicting antioxidant scavenging activity of various samples, RCZnO NP, BRZnO NP, and ZnO NP displaying the 2,2-diphenyl-1-picrylhydrazyl (DPPH) percentage (%) and half-maximal inhibitory concentration ($IC_{50}$) values for each sample, according to certain embodiments.
Figure 5A:
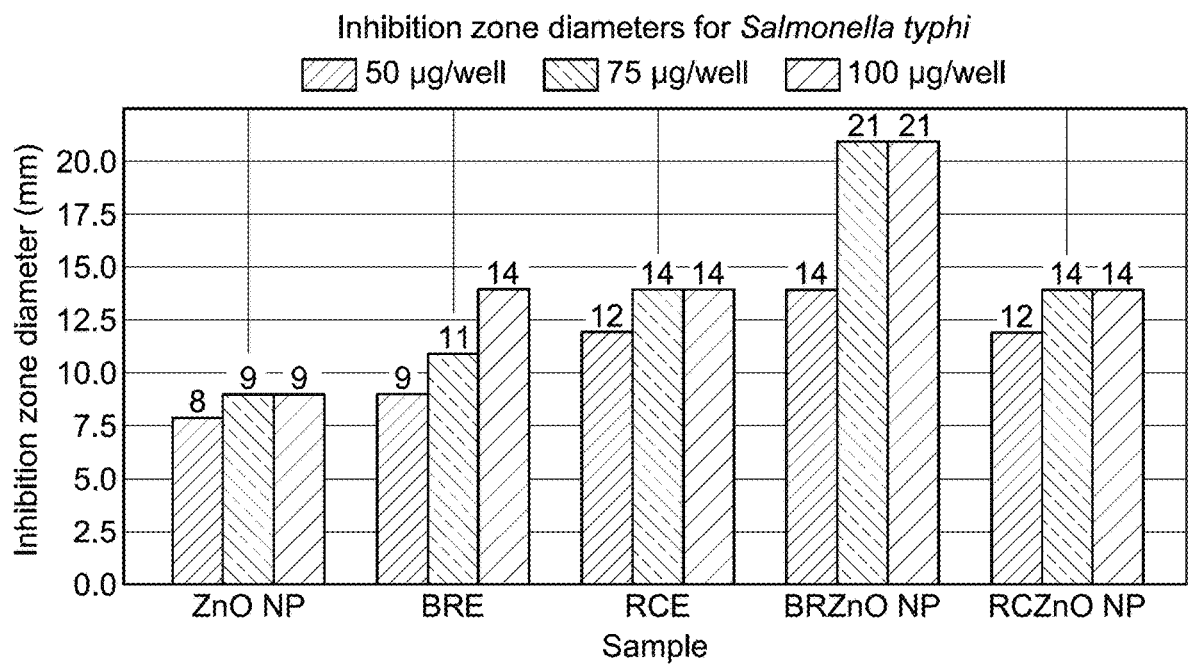
FIG. 5A depicts antibacterial activity of beetroot extract (BRE) with inhibition zone diameters measured by the well diffusion assay for Salmonella typhi, according to certain embodiments.
Figure 5B:
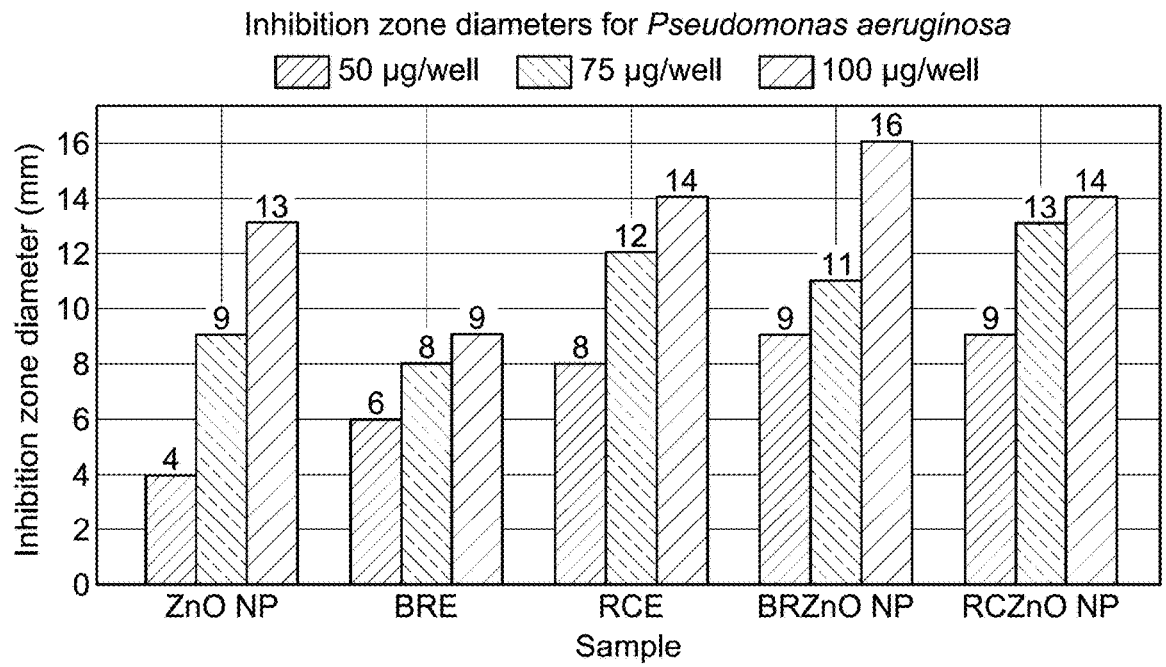
FIG. 5B depicts the antibacterial activity of red cabbage extract (RCE), with inhibition zone diameters measured by the well diffusion assay for Pseudomonas aeruginosa, according to certain embodiments.
Figure 5C:
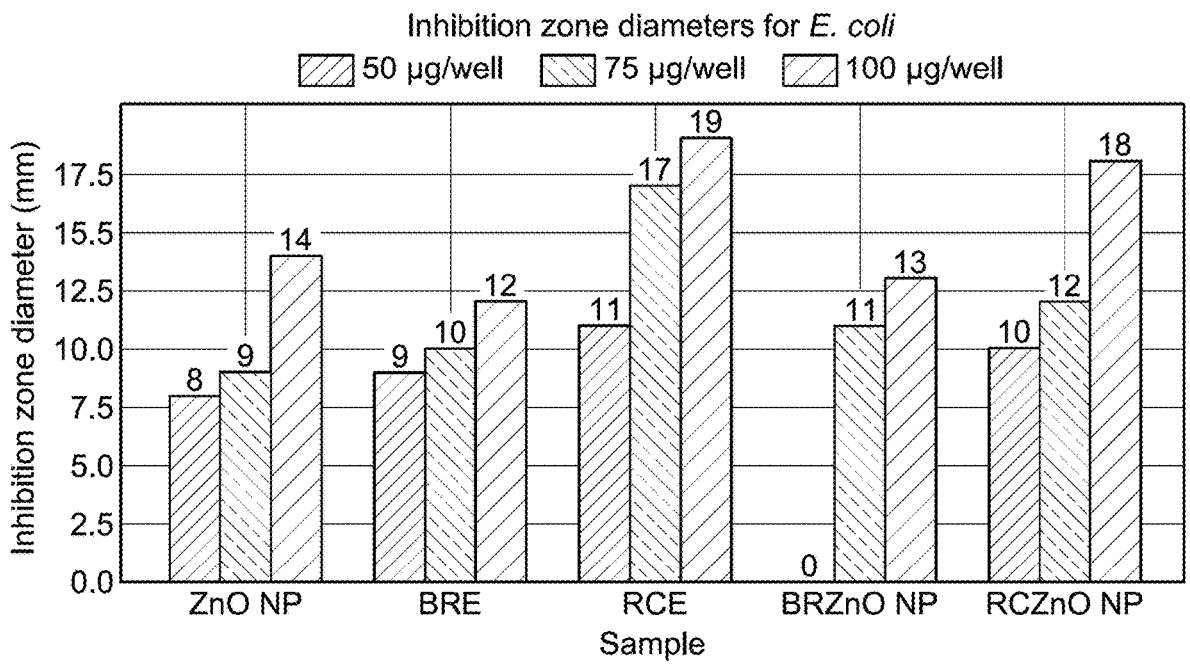
FIG. 5C depicts the antibacterial activity of RCZnO NP, with inhibition zone diameters measured by the well diffusion assay for Escherichia coli, according to certain embodiments.
Figure 5D:
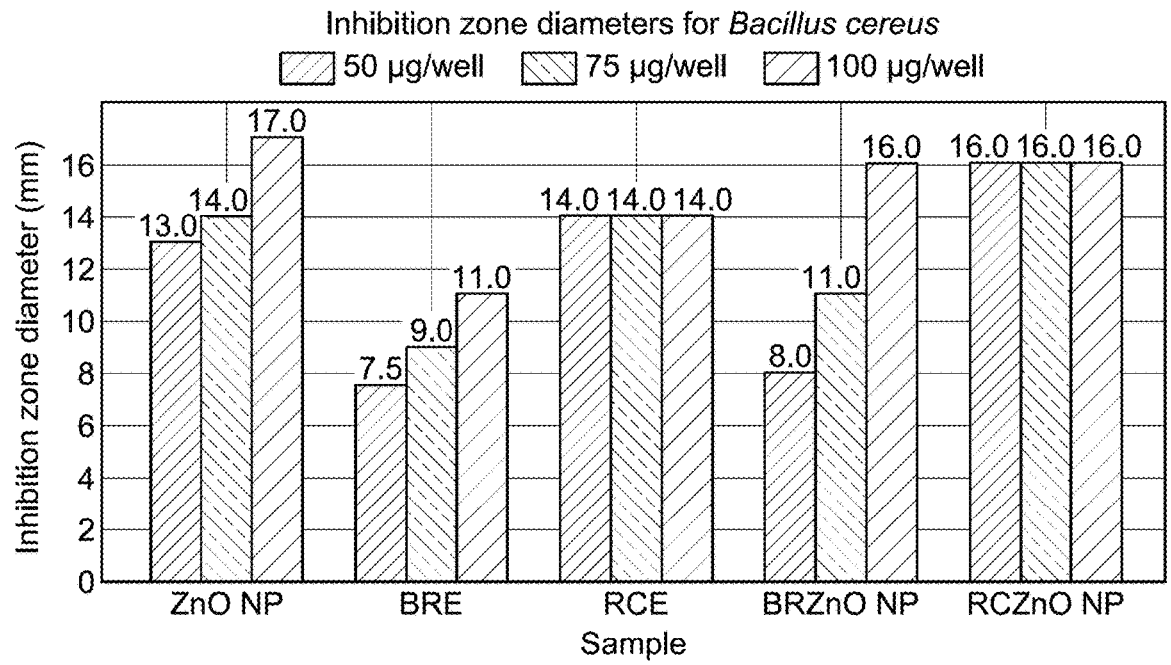
FIG. 5D depicts the antibacterial activity of BRZnO NP, with inhibition zone diameters (mm) measured by the well diffusion assay for Bacillus cereus, according to certain embodiments.
Figure 5E:
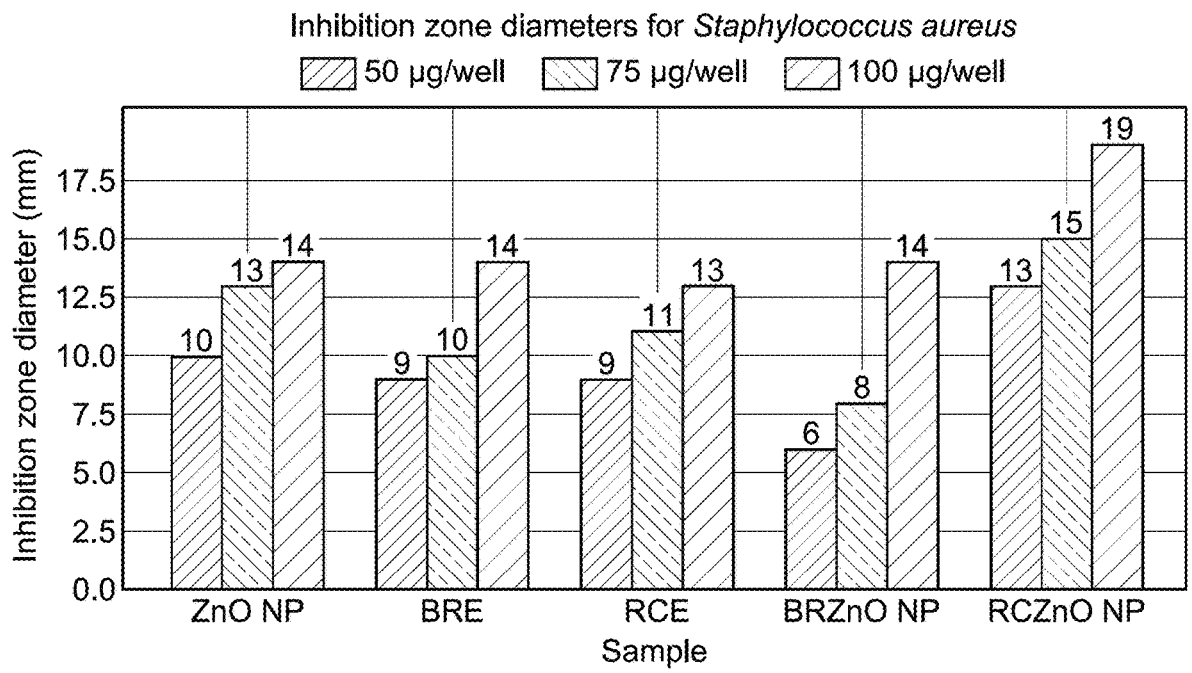
FIG. 5E depicts the antibacterial activity of ZnO NP, with inhibition zone diameters (mm) measured by the well diffusion assay for Staphylococcus aureus, according to certain embodiments.

Example 4: Analysis of Proximate Composition, Yield, TPC, TFC, DPPH %, and $IC_{50}$ in ZnO NP, RCZnO NP, and BRZnO NP Table 3 and FIG. 4 compares the antioxidant activity of RCZnO NP, BRZnO NP, and ZnO NP based on two parameters including DPPH % and $IC_{50}$ values in mg/mL. RCZnO NP demonstrated the strongest antioxidant capacity with the highest DPPH value of 92.03%. BRZnO NP follows with a DPPH value of 60.5%, indicated significant antioxidant properties. ZnO NP had the lowest DPPH value at 44.5%. In terms of $IC_{50}$ values, RCZnO NP has the lowest $IC_{50}$ of 1.93 mg/mL, making RCZnO NP effective at inhibiting 50% of free radicals with the smallest concentration. BRZnO NP has an $IC_{50}$ value of 3.013 mg/mL, and ZnO NP has the highest $IC_{50}$ at 4.856 mg/mL. Overall, RCZnO NP showed potent antioxidant activity, followed by BRZnO NP, while ZnO NP had the lowest antioxidant activity among the three samples.

TABLE 3

Antioxidant scavenging activity analysis of RCZnO NP, BRZnO NP, and ZnO NP

| Parameter | ZnO NP | BRZnO NP | RCZnO NP |
| --- | --- | --- | --- |
| DPPH % | 44.5 | 60.5 | 92.03 |
| $IC_{50}$ (mg/mL) | 4.856 | 3.013 | 1.93 |

Example 5: Antibacterial Activity of BRE, RCE, RC ZnO NP, BR ZnO NP, and ZnO NP Using the well diffusion assay, Table 4 and FIGS. 5A-5E show the antibacterial activity of various samples including the BR extract (BRE), RC extract (RCE), BRZnO NP, RC ZnO NP, and ZnO NP, against five bacterial strains including *Bacillus cereus, Escherichia coli, Pseudomonas aeruginosa,* and *Staphylococcus aureus, Salmonella typhi*. The outcomes unequivocally show that the type of bacteria and sample concentration have an impact on the antibacterial efficacy. ZnO NP demonstrated concentration-dependent antibacterial activity, meaning that the concentration increased, and the inhibition zone diameter increased against all tested microorganisms. The zone of inhibition increased from 10 mm at 50 µl/well to 14 mm at 100 µl/well against *Staphylococcus aureus* and from 13 mm to 17 mm at the same dosages for *Bacillus cereus*. Because of structural differences in cell walls of the synthesized nanoparticles, which frequently confer greater resistance to external agents, the efficacy against gram-negative bacteria, such as *Pseudomonas aeruginosa* and *Salmonella typhi*, was comparatively lower, with inhibition zones ranging from 4 mm to 13 mm and 8 mm to 9 mm, respectively. When tested at the highest dose of 100 µl/well, BRE showed 14 mm of inhibition zone against *Staphylococcus aureus*, which was the main target of its moderate antibacterial activity. *Pseudomonas aeruginosa* and *Bacillus cereus*, on the other hand, showed comparatively reduced inhibition, with *Bacillus cereus* displaying just an 11 mm maximal inhibition zone. *Escherichia coli* grew from 9 mm to 12 mm in size. Strong antibacterial activity was shown by RCE, specifically against *Bacillus cereus* and *Escherichia coli*, where inhibition zones measured at 100 µl/well were 14 mm and 19 mm, respectively. This extract demonstrated efficacy against a broad spectrum of bacterial species, demonstrating the existence of biologically active ingredients that can target many bacterial species. Overall, the findings point to RCE as a promising option for antibacterial applications, particularly against strains that are gram-positive. BRZnO NP showed a lower antibacterial effect compared to RCZnO NP but still exhibited significant activity against *Bacillus cereus* and *Salmonella typhi*, where inhibition zones reached 16 mm and 21 mm at 100 µl/well, respectively. The abovementioned combination provides a synergistic interaction between the bioactive compound and ZnO NP, enhancing the antibacterial properties against certain strains, particularly *Salmonella typhi*, where it showed a higher inhibitory effect than the other samples. RCZnO NP demonstrated the highest antibacterial activity among some samples. It achieved an inhibition zone of 19 mm against *Staphylococcus aureus* and 18 mm against *Escherichia coli* at 100 µl/well, illustrating that the combination of the RC extract with ZnO NP produces a potent antimicrobial effect. All samples showed a clear concentration-dependent relationship with antibacterial efficacy, with the inhibition zones increasing as the concentration of the sample increased. RCZnO NP nanocomposite exhibited the most significant antibacterial activity, illustrating that the combination of nanoparticles with bioactive extracts amplifies the overall effect. In contrast, BRE and BRZnO NP showed moderate activity, while ZnO NP alone demonstrated notable but slightly lower efficacy compared to the combination samples. Furthermore, the findings demonstrate that ZnO NP when combined with bioactive extracts like RCZnO NP, may enhance antibacterial activity against of pathogenic bacteria.

TABLE 4

Antibacterial activity of BRE, RCE, RC ZnO NP, BR ZnO NP, and ZnO NP

| Sample | Conc. μl/well | Staphylococcus aureus | Bacillus cereus | E. coli | Pseudomonas aeruginosa | Salmonella typhi |
|---|---|---|---|---|---|---|
| ZnO NP | 50 | 10 | 13 | 8 | 4 | 8 |
|  | 75 | 13 | 14 | 9 | 9 | 9 |
|  | 100 | 14 | 17 | 14 | 13 | 9 |
| BRE | 50 | 9 | 7.5 | 9 | 6 | 9 |
|  | 75 | 10 | 9 | 10 | 8 | 11 |
|  | 100 | 14 | 11 | 12 | 9 | 14 |
| RCE | 50 | 9 | 14 | 11 | 8 | 12 |
|  | 75 | 11 | 14 | 17 | 12 | 14 |
|  | 100 | 13 | 14 | 19 | 14 | 14 |
| BRZnO NP | 50 | 6 | 8 | 0 | 9 | 14 |
|  | 75 | 8 | 11 | 11 | 11 | 21 |
|  | 100 | 14 | 16 | 13 | 16 | 21 |
| RCZnO NP | 50 | 13 | 16 | 10 | 9 | 12 |
|  | 75 | 15 | 16 | 12 | 13 | 14 |
|  | 100 | 19 | 16 | 18 | 14 | 14 |

Example 6: Antifungal Activity of BRE, RCE, RCZnO NP, BRZnO NP, and ZnO NP

Figure 6:
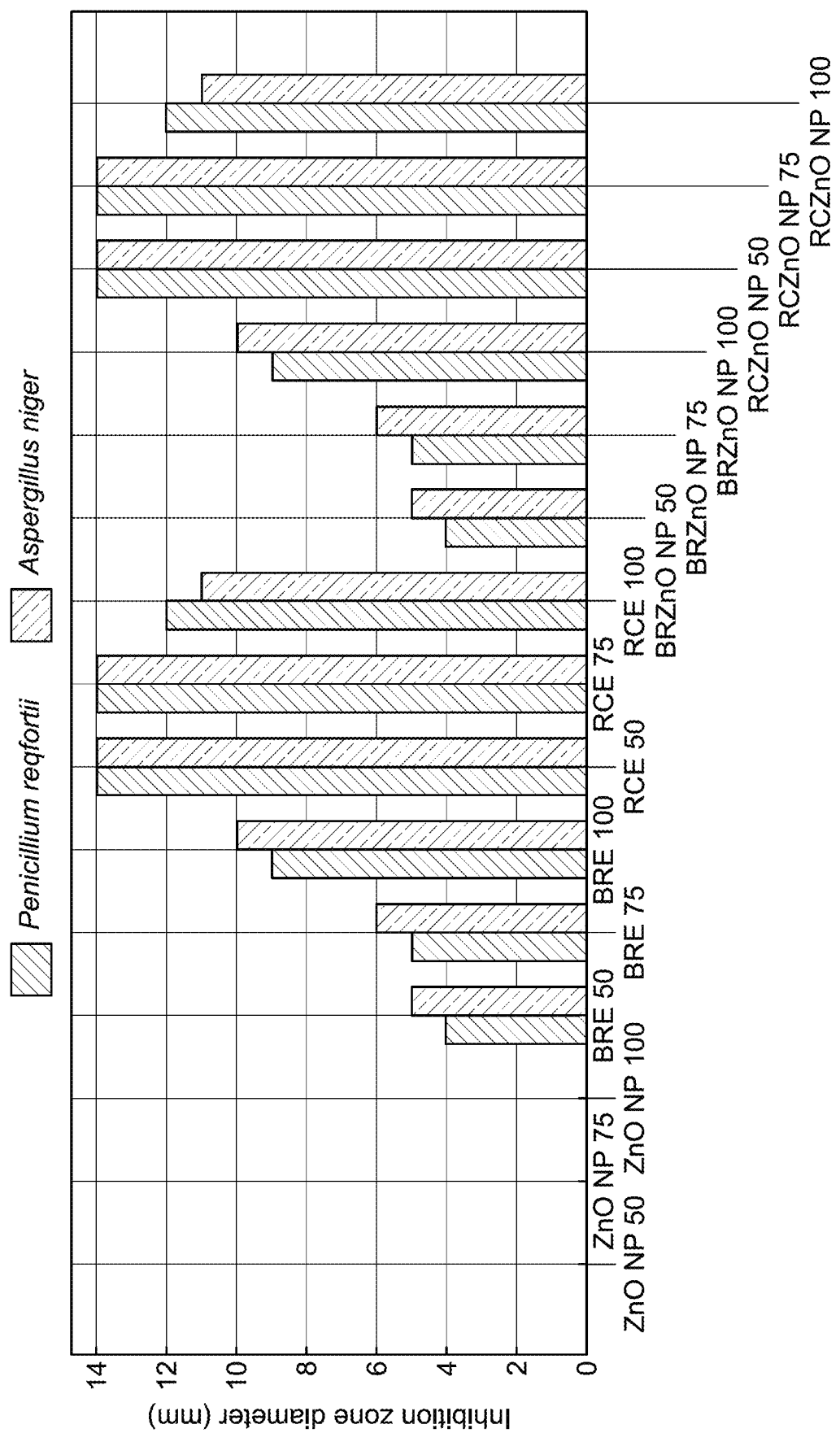
FIG. 6 depicts antifungal activity of BRE, RCE, RCZnO NP, BRZnO NP, and ZnO NP evaluated by well diffusion assay, according to certain embodiments.

An analysis of antifungal activity of various samples, including BRE, RCE, BRZnO NP, RCZnO NP and ZnO NP was conducted, as listed in Table 5 and shown in FIG. 6. The inhibition zone diameters were measured for *Aspergillus niger* and *Penicillium reqfortii* using the well diffusion assay. The measurements reflected the potential antifungal activity of the samples at different concentrations including 50 μL/well, 75 μL/well, and 100 μL/well. For *Aspergillus niger*, pure ZnO NP showed no inhibition at any concentration, indicating that ZnO NP alone lacks antifungal activity against this particular fungal strain. In contrast, both BRE and RCE exhibited notable antifungal activity, with BRE showing an inhibition zone diameter of 6 mm at 75 μL and 10 mm at 100 μL. Similarly, RCE produced inhibition zones of 14 mm and 11 mm at 75 μL and 100 μL, respectively, demonstrating stronger antifungal efficacy compared to BRE.

Further, the nanocomposite of ZnO NP with the BR, and RC demonstrated a marked improvement in antifungal activity relative to ZnO NP alone. BRZnO NP yielded inhibition zones of 6 mm at 75 μL and 10 mm at 100 μL, while RCZnO NP produced larger inhibition zones of 14 mm at 75 μL. The results provide a synergistic effect between ZnO NP and the bioactive components of the extracts, enhancing antifungal potential of ZnO NP against *Aspergillus niger*. Pure ZnO NP showed no inhibition at any concentration, indicating that ZnO NP alone lacks antifungal activity against this particular fungal strain. On the other hand, BRE and RCE showed high antifungal activity, with inhibition zones increasing from 4 mm to 9 mm at 50 μL and 100 μL for BRE and 14 mm at 50 μL and 75 μL for RCE as the concentration increased. BRZnO NP and RCZnO NP depicted inhibition zones of 5 mm at 75 μL and 9 mm at 100 μL for BRZnO NP, respectively. RCZnO NP showed consistent activity, producing inhibition zones of 14 mm and 12 mm at 75 μL and 100 μL, respectively. It may be concluded that ZnO NP combined with plant extracts such as BRE and RCE significantly enhanced its efficacy. The findings support the hypothesis that the bioactive components of the extracts synergize with the nanoparticles to produce greater antifungal effects.

TABLE 5

Antifungal activity of BRE, RCE, RCZnO NP, BRZnO NP, and ZnO NP measured by well diffusion assay (inhibition zone diameters in mm).

| Samples | Concentration (μL/well) | Aspergillus niger | Penicillium reqfortii |
|---|---|---|---|
| ZnO NP | 50 | 0 | 0 |
|  | 75 | 0 | 0 |
|  | 100 | 0 | 0 |
| BR extract | 50 | 5 | 4 |
|  | 75 | 6 | 5 |
|  | 100 | 10 | 9 |
| RC extract | 50 | 14 | 14 |
|  | 75 | 14 | 14 |
|  | 100 | 11 | 12 |
| BR ZnO NP | 50 | 5 | 4 |
|  | 75 | 6 | 5 |
|  | 100 | 10 | 9 |
| RC ZnO NP | 50 | 14 | 14 |
|  | 75 | 14 | 14 |
|  | 100 | 11 | 12 |

Example 7: Growth Curve Assay

Figure 7:
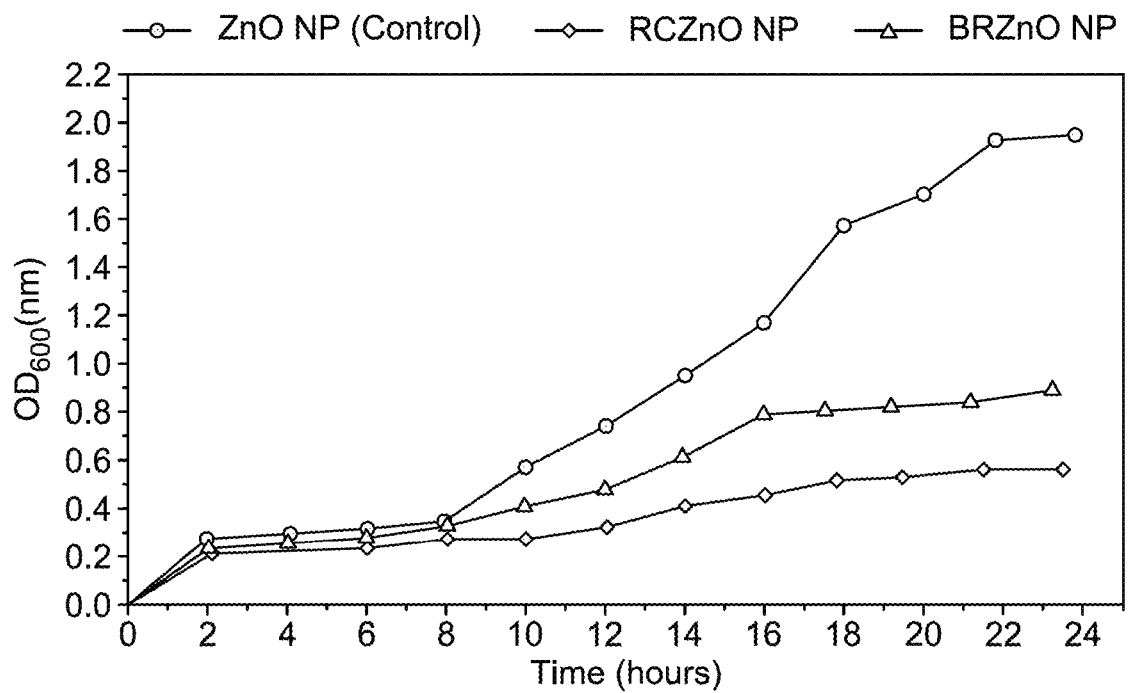
FIG. 7 depicts the effect of ZnO NP(control), BRZnO NP, and RCZnO NP on growth of Staphylococcus aureus, according to certain embodiments.

An impact of a plurality of extract combinations on the growth of *Staphylococcus aureus* was evaluated using the growth curve method, as illustrated in FIG. 7. In order to track bacterial growth, the absorbance at 600 nm (OD600) was measured. The untreated control of *S. aureus* showed vigorous growth, reaching an OD600 of 1.99. In contrast, when *S. aureus* was treated with RCZnO NP and BRZnO NP, the growth was significantly reduced. Specifically, the OD600 values dropped to 0.495 with the BRE and 0.77 with the RCE. The reductions indicate a strong inhibition of bacterial growth. The observed decreases in $OD_{600}$ demonstrates that the extracts, when combined with zinc oxide, have a synergistic effect, enhancing antimicrobial properties of the nanoparticles. Results highlighted the potential of BRE and RCE combinations for antimicrobial applications.

Example 8. Determination of Protein Leakage from Bacterial Cell Membranes

Figure 8:
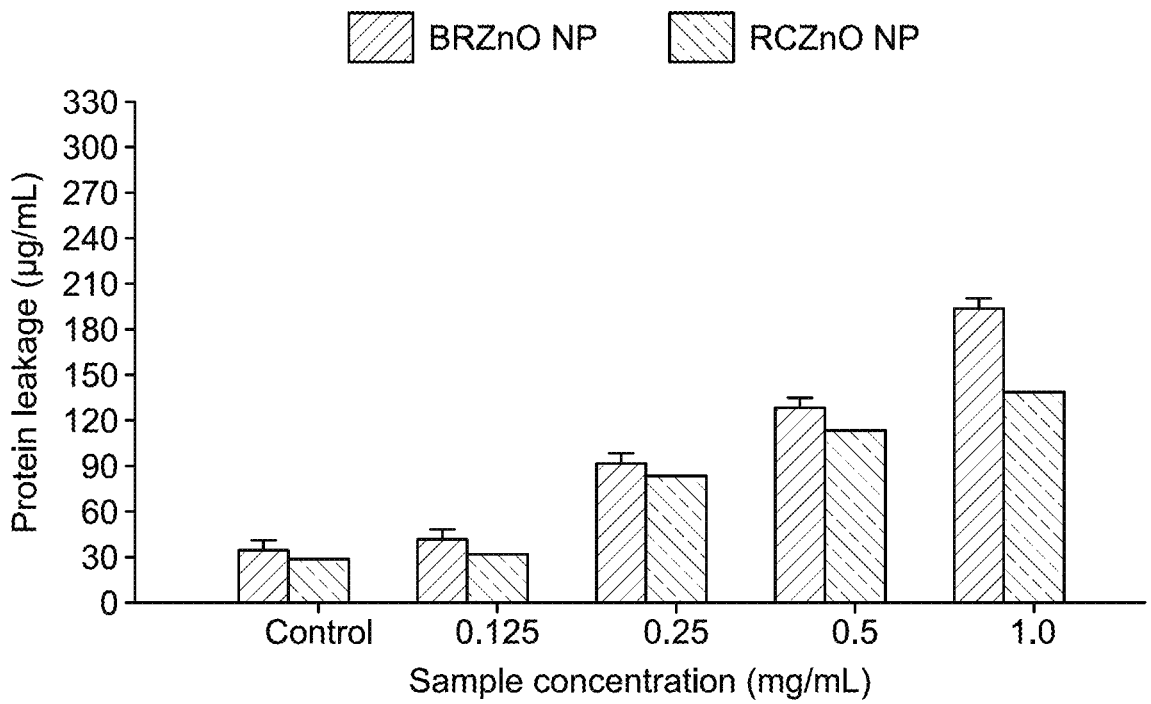
FIG. 8 depicts the impact of BRZnO NP and RCZnO NP on protein leakage from the cell membranes of Staphylococcus aureus, according to certain embodiments.

The results of protein leakage, depicted in FIG. 8, show a concentration-dependent increase in protein leakage, which indicates greater disruption of bacterial cell membranes. At highest concentration of about 1.0 mg/mL, the release of protein was notably higher when zinc oxide was combined with the RCE or the BRE, compared to the control. In particular, BRZnO NP released 191.98 mg/mL of protein, while the RCZnO NP released 141.33 mg/mL. The increased protein leakage confirms the superior antibacterial activity of the nanoparticles. The presence of protein molecules both in the bacterial cytoplasm and surrounding the *S. aureus* cells further corroborates the observed antibacterial effect. Hence, it may be concluded that the combination treatments are effective at disrupting the bacterial membrane.

Example 9. Anti-Bio Film Potential Treatment

Figure 9:
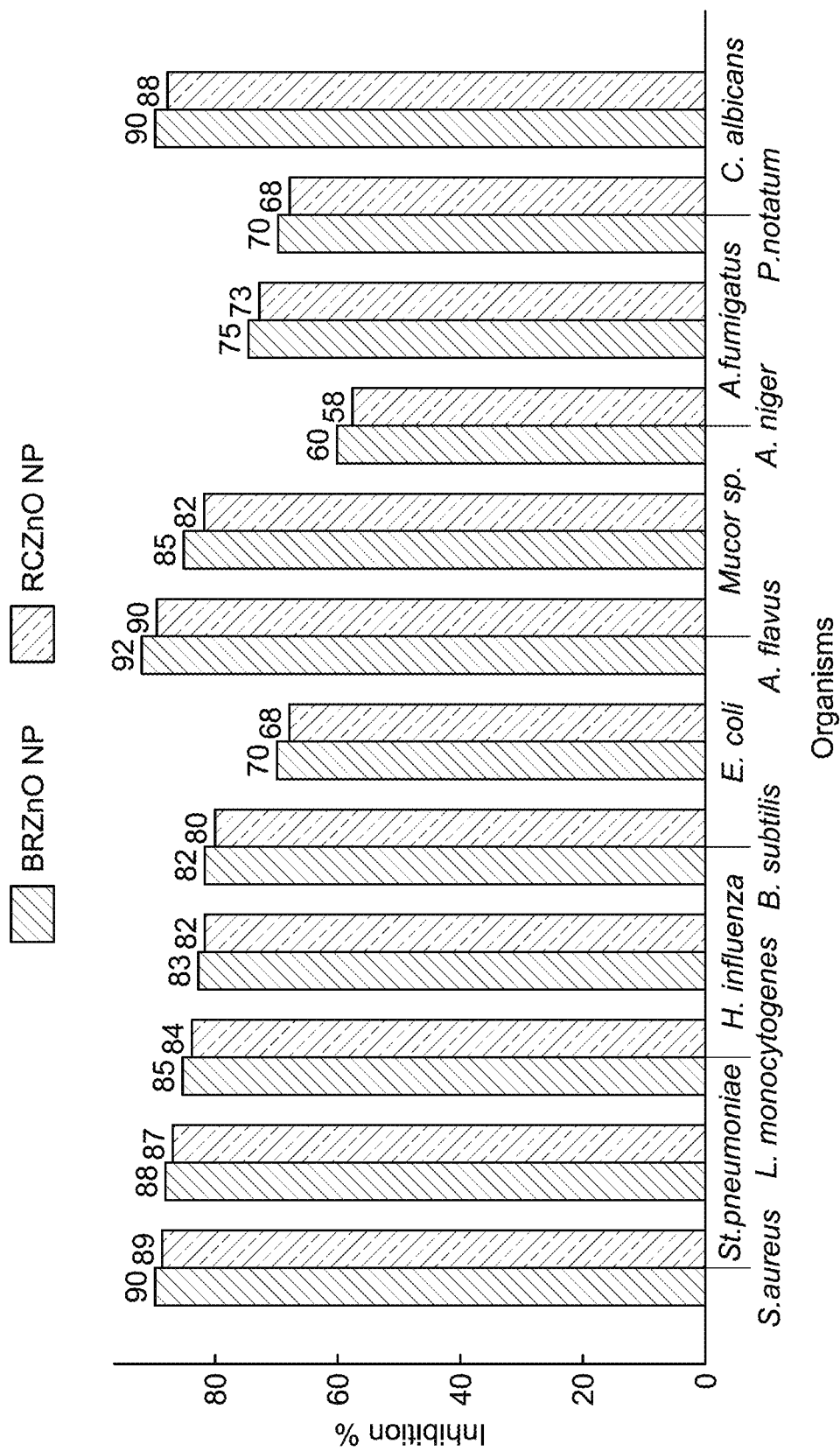
FIG. 9 depicts the inhibition percentages for multiple pathogenic microbes by BRZnO NP and RCZnO NP, according to certain embodiments.
Figure 10A:
FIG. 10A is an optical image of petri dishes depicting antimicrobial and antifungal action of BRZnO NP, according to certain embodiments, against (from left to right) Salmonella typhi, Staphylococcus aureus, Bacillus cereus, Escherichia coli, and Pseudomonas aeruginosa.
Figure 10B:
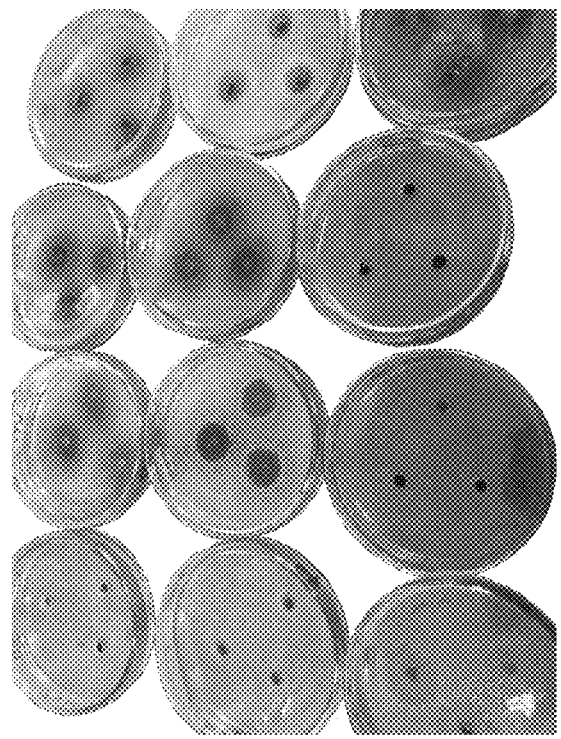
FIG. 10B is another optical image of petri dishes depicting antimicrobial and antifungal action of BR ZnO NP, ZnO NP, and RC ZnO NP, according to certain embodiments, against Salmonella typhi, Staphylococcus aureus, Bacillus cereus, Escherichia coli, and Pseudomonas aeruginosa.
Figure 10C:
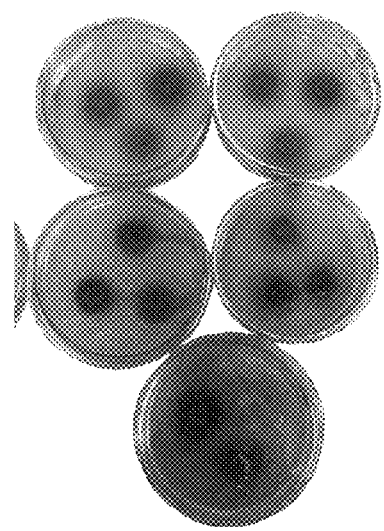
FIG. 10C is yet another optical image of petri dishes depicting antimicrobial and antifungal action of RCZnO NP, according to certain embodiments, against (from left to right) Salmonella typhi, Escherichia coli, Bacillus cereus, Pseudomonas aeruginosa, and Staphylococcus aureus.
Figure 10D:
FIG. 10D is yet another optical image of petri dishes depicting antimicrobial and antifungal action of BRZnO NP, according to certain embodiments, against (from left to right) Salmonella typhi, Staphylococcus aureus, Bacillus cereus, Escherichia coli, and Pseudomonas aeruginosa.
Figure 10E:
FIG. 10E is yet another optical image of petri dishes depicting antimicrobial and antifungal action of red cabbage (RC) extract, according to certain embodiments, against (from left to right) Salmonella typhi, Escherichia coli, Bacillus cereus, Pseudomonas aeruginosa, and Staphylococcus aureus.
Figure 10F:
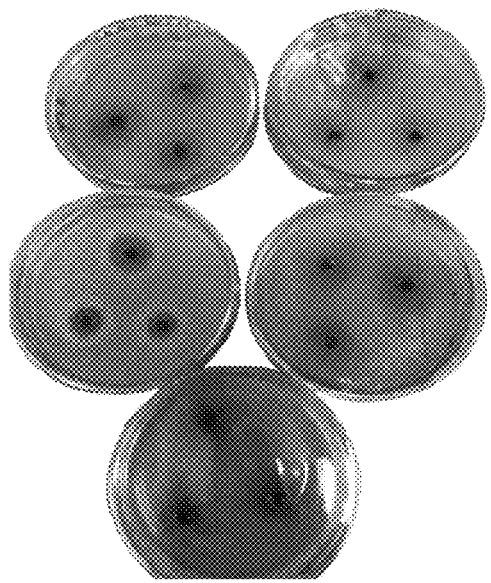
FIG. 10F is yet another optical image of petri dishes depicting antimicrobial and antifungal action of beetroot (BR) extract, according to certain embodiments, against (from left to right) Salmonella typhi, Staphylococcus aureus, Bacillus cereus, Escherichia coli, and Pseudomonas aeruginosa.

The results of anti-bio fil potential treatment are depicted in Table 6 and FIG. 9. The results indicate one or more differences in biofilm inhibition across various treatments. The control tubes, which lacked synthesized materials, exhibited substantial biofilm formation. This was demonstrated by a staining with crystal violet and a thick layer at the air-liquid contact. In contrast, tubes treated with BRZnO NP or RCZnO NP, depicted inhibition of biofilm formation. In particular, biofilm formation was reduced by 88.6% with BRZnO NP, and by 89.4% with RCZnO NP, when compared to the control. Optical density measurements at 570 nm corroborated these findings, with OD570 readings being significantly lower for the BRZnO NP and the RCZnO NP treatments. This indicates a reduced amount of crystal violet-stained biofilm. The dark blue color (not shown) observed after crystal violet staining and ethanol extraction further confirmed the extent of biofilm formation. Hence, it may be concluded that the RCZnO NP and the BRZnO NP displayed superior anti-biofilm activity, as evidenced by the less intense staining compared to control. Furthermore, the findings demonstrate the improved antibiofilm capabilities of ZnO NP, when paired with BR or RC. The superior performance of the BRZnO NP and the RCZnO NP illustrate that they are more effective in preventing biofilm development. This enhanced activity likely stems from the synergistic effects of the combined extracts. These findings indicate the potential of this formulation for controlling biofilm-related infections and providing a more effective solution against pathogenic microorganisms.

TABLE 6

Semi-quantitative inhibition percent of the biofilm formation for non-treated and treated bacterial and fungi pathogens

| Test organism | OD (of crystal violet stain) at 570.0 nm Control (ZnONP) | RC ZnO NP | BR ZnO NP | Inhibition % RC ZnO NP | BR ZnO NP |
|---|---|---|---|---|---|
| S. aureus | 0.928 ± 0.005 | 0.106 ± 0.003 | 0.098 ± 0.005 | 88.57% | 89.40% |
| S. pneumoniaes | 0.786 ± 0.006 | 0.125 ± 0.003 | 0.118 ± 0.008 | 84.13% | 84.94% |
| L. monocytogenes | 0.656 ± 0.006 | 0.127 ± 0.002 | 0.137 ± 0.003 | 80.70% | 79.07% |
| H. influencza | 0.939 ± 0.006 | 0.228 ± 0.003 | 0.203 ± 0.002 | 75.73% | 78.39% |
| B. subtlis | 0.545 ± 0.002 | 0.111 ± 0.006 | 0.190 ± 0.002 | 79.64% | 65.22% |
| E. coli | 0.815 ± 0.006 | 0.243 ± 0.002 | 0.222 ± 0.005 | 46.63% | 48.35% |
| A.flavus | 0.778 ± 0.004 | 0.317 ± 0.002 | 0.375 ± 0.006 | 59.25% | 51.84% |

TABLE 6-continued

Semi-quantitative inhibition percent of the biofilm formation for non-treated and treated bacterial and fungi pathogens

| Test organism | OD (of crystal violet stain) at 570.0 nm Control (ZnONP) | RC ZnO NP | BR ZnO NP | Inhibition % RC ZnO NP | BR ZnO NP |
|---|---|---|---|---|---|
| M. cirinelloides. | 0.770 ± 0.007 | 0.358 ± 0.003 | 0.373 ± 0.002 | 53.49% | 51.49% |
| A.niger | 0.790 ± 0.002 | 0.450 ± 0.003 | 0.417 ± 0.002 | 43.10% | 47.24% |
| A.fumigatus | 0.677 ± 0.002 | 0.429 ± 0.003 | 0.447 ± 0.003 | 36.65% | 33.89% |
| P.notatum | 0.726 ± 0.002 | 0.477 ± 0.002 | 0.414 ± 0.002 | 34.31% | 42.90% |
| C.albicans | 0.756 ± 0.003 | 0.302 ± 0.003 | 0.291 ± 0.002 | 60.12% | 61.57% |

The present disclosure illustrates that the RCZnO NP and the BRZnO NP, disclosed herein, may provide a strong, natural substitute for synthetic (i.e., artificial) preservatives in food preservation. The antioxidant abilities and wide range of bacterial and fungal inhibition makes RCZnO NP and BRZnO NP, highly potent for improving food safety and prolonging shelf life while satisfying consumer preferences for natural and environmentally friendly ingredients. Hence, the present disclosure provides an effective approach to utilizing natural waste products and plant extracts in developing multifunctional materials for food preservation, potentially reducing reliance on chemical preservatives and supporting a more sustainable and health-conscious food industry.

Numerous modifications and variations of the present disclosure are possible in light of the above teachings. Therefore, it is to be understood that within the scope of the appended claims, the invention may be practiced other than as specifically described herein.

The invention claimed is:

1. A method of inhibiting a growth of at least one bacterium and/or at least one fungus on a food product, the method comprising:
adding a food preservative to the food product, thereby antimicrobially and antioxidatively preserving the food product, the antioxidately preserving of the food preservative having an $IC_{50}$ half-maximal inhibitory concentration of DPPH radicals of 4 mg/mL or less,
wherein the bacterium is *Staphylococcus aureus, Staphylococcus pneumoniae, Listeria monocytogenes, Haemophilus influenza, Bacillus subtilis,* or *Escherichia coli*, and
wherein the fungus is *Candida albicans, Aspergillus flavus, Mucor circinelloides, Aspergillus fumigants, Penicillium notatum, Penicilliun reqfortii,* or *Aspergillus niger,*
wherein the food preservative comprises (i) zinc oxide nanoparticles derived from a pomegranate peel extract, and (ii) a beetroot extract and/or a red cabbage extract, the extract being a dried ethanolic extract,
wherein the beetroot extract comprises crude protein in a range of from 1.8 to 2.4 wt. % crude protein, crude fat in a range of from 0.2 to 0.6 wt. % crude fat, a total phenol content in a range of from 340 to 360 mg gallic acid equivalent/100 g dry weight, and a total flavonoid content in a range of from 170 to 230 mg quercetin equivalent/100 g dry weight, phenols of the beetroot extract comprising epicatechin, gallic acid, and chlorogenic acid, and flavonoids of the beetroot extract comprising quercetin and betagarin, wherein the red cabbage extract comprises crude protein in a range of from 1 to 2 wt. %, crude fat in a range of from 0.05 to 0.150 wt. %, a total phenol content in a range of from 580 to 620 mg gallic acid equivalent/100 g dry weight, and a total flavonoid content in a range of from 230 to 270 mg quercetin equivalent/100 g dry weight, phenols of the red cabbage extract comprising ferulic acid and p-coumaric acid, and flavonoids of the red cabbage extract comprising quercetin and cyanidin, wherein the food preservative has an FTIR pattern comprising a broad peak in a range of from 3000 to 3500 cm$^{-1}$ and a series of three peaks in a range of from 900 to 1200 cm$^{-1}$.

2. The method of claim 1, wherein the bacterium is *Staphylococcus aureus*.

3. The method of claim 1, wherein the fungus is *Aspergillus niger*.

4. The method of claim 1, wherein the fungus is *Penicillium reqfortii*.

5. The method of claim 1, wherein the food preservative comprises the beetroot extract.

6. The method of claim 1, wherein the food preservative comprises the red cabbage extract.

7. The method of claim 1, wherein the food preservative comprises the beetroot extract and the red cabbage extract.

8. The method of claim 1, wherein the food preservative consists of (i) the zinc oxide nanoparticles derived from a pomegranate peel extract, and (ii) the beetroot extract and/or the red cabbage extract.

9. The method of claim 1, wherein the food preservative comprises the beetroot extract, the beetroot extract having 7 to 8 wt. % carbohydrate content.

10. The method of claim 1, wherein the food preservative comprises the red cabbage extract, the red cabbage extract having 4 to 6.5 wt. % carbohydrate content.

11. The method of claim 1, wherein the food preservative comprises the beetroot extract, the total phenol content being in a range of from 340 to 350 mg gallic acid equivalent/100 g dry weight, the phenols further comprising quercetin-3-O-rutinoside, kaempferol, vanillin, vanillic acid, hydroxybenzoic acid, and ferulic acid.

12. The method of claim 1, wherein the food preservative comprises the beetroot extract, the total flavonoid content being in a range of from 180 to 220 mg quercetin equivalent/100 g dry weight.

13. The method of claim 1, wherein the food preservative comprises the beetroot extract, the total flavonoid content being in a range of from 190 to 220 mg quercetin equivalent/100 g dry weight, the flavonoids further comprising rhamnetin, rhamnocitrin, astragalin, and tiliroside.

14. The method of claim 1, wherein the food preservative comprises the red cabbage extract, the total phenol content being in a range of from 590 to 610 mg gallic acid equivalent/100 g dry weight.

15. The method of claim 1, wherein the food preservative comprises the red cabbage extract, the total phenol content being in a range of from 590 to 600 mg gallic acid equivalent/100 g dry weight, the phenols of the red cabbage extract further comprising sinapic acid, hydroxycinnamic acid.

16. The method of claim 1, wherein the food preservative comprises the red cabbage extract, the total flavonoid content being in a range of from content of 240 to 260 mg quercetin equivalent/100 g dry weight.

17. The method of claim 1, wherein the food preservative comprises the red cabbage extract, the total flavonoid content being in a range of from content of 250 to 260 mg quercetin equivalent/100 g dry weight, the flavonoids of the red cabbage extract further comprising apigenin.

18. The method of claim 1, wherein the IC$_{50}$ half-maximal inhibitory concentration of the DPPH radicals is no more than 3.85 mg/mL.

19. The method of claim 1, wherein the IC$_{50}$ half-maximal inhibitory concentration of the DPPH radicals is no more than 2.09 mg/mL.

\* \* \* \* \*